United States Patent [19]

Tanabe et al.

[11] Patent Number: 5,590,008
[45] Date of Patent: Dec. 31, 1996

[54] MAGNETIC DISC UNIT HAVING A PLURALITY OF MAGNETIC HEADS WHICH INCLUDE MULTILAYER MAGNETIC FILMS

[75] Inventors: Masanori Tanabe, Odawara; Hiroshi Fukui, Hitachi; Tadayuki Iwakura, Hitachi; Kazuhiro Nakamoto, Hitachi; Moriaki Fuyama, Hitachi; Katsuya Mitsuoka, Hitachi; Masaaki Sano, Hitachi; Makoto Saito, Hiratsuka; Makoto Aihara, Katsuta; Shuji Sudo, Hitachi, all of Japan

[73] Assignee: Hitachi, Ltd., Tokyo, Japan

[21] Appl. No.: 324,380

[22] Filed: Oct. 17, 1994

Related U.S. Application Data

[63] Continuation of Ser. No. 873,219, Apr. 24, 1992, abandoned.

[30] Foreign Application Priority Data

Apr. 25, 1991 [JP] Japan .................. 3-095145

[51] Int. Cl.⁶ ........................................... G11B 5/147
[52] U.S. Cl. ........................................... 360/126
[58] Field of Search ............................. 360/97.01, 103, 360/104, 106, 113, 119, 125, 126

[56] References Cited

U.S. PATENT DOCUMENTS

| | | | |
|---|---|---|---|
| 4,644,432 | 2/1987 | Heim | 360/126 |
| 4,780,781 | 10/1988 | Sano et al. | 360/126 |
| 4,799,118 | 1/1989 | Yamada et al. | 360/126 |
| 4,873,599 | 10/1989 | Sueoka | 360/126 |
| 4,943,879 | 7/1990 | Takano et al. | 360/126 |
| 4,972,285 | 11/1990 | Otomo et al. | 360/120 |
| 5,025,335 | 6/1991 | Stefarsky | 360/97.01 |
| 5,025,342 | 6/1991 | Nagata et al. | 360/126 |
| 5,032,945 | 7/1991 | Argyle et al. | 360/126 |
| 5,095,397 | 3/1992 | Nagata et al. | 360/126 |
| 5,099,376 | 3/1992 | Ino et al. | 360/121 |
| 5,157,570 | 10/1992 | Shukovsky et al. | 360/125 |
| 5,224,002 | 6/1993 | Nakashima et al. | 360/126 |
| 5,241,440 | 8/1993 | Ashida et al. | 360/126 |
| 5,245,493 | 9/1993 | Kawabe et al. | 360/126 |
| 5,287,237 | 2/1994 | Kitada et al. | 360/126 |

FOREIGN PATENT DOCUMENTS

| | | |
|---|---|---|
| 58-171709 | 10/1983 | Japan . |
| 60-35316 | 2/1985 | Japan . |
| 2-126410 | 5/1990 | Japan . |

OTHER PUBLICATIONS

IEEE Transactions on Magnetics, vol. 25, #5, Sep. 1989, "Delayed Relaxation in Thin-Film Heads", Klaassen et al.

*Primary Examiner*—Jefferson Evans
*Attorney, Agent, or Firm*—Antonelli, Terry, Stout & Kraus

[57] ABSTRACT

A magnetic disc unit has a thin film magnetic head in which a lower magnetic core and an upper magnetic core form a magnetic circuit. The upper magnetic core is constructed by magnetic films having at least two layers. A saturation magnetic flux density of the inside magnetic film, of the magnetic films having at least two layers, facing a magnetic gap of the magnetic circuit is larger than that of the outside magnetic films of the upper magnetic core and the lower magnetic core.

30 Claims, 12 Drawing Sheets

$$\frac{\Delta H_{xT}}{\Delta x} > \frac{\Delta H_{xL}}{\Delta x}$$

F I G. 12
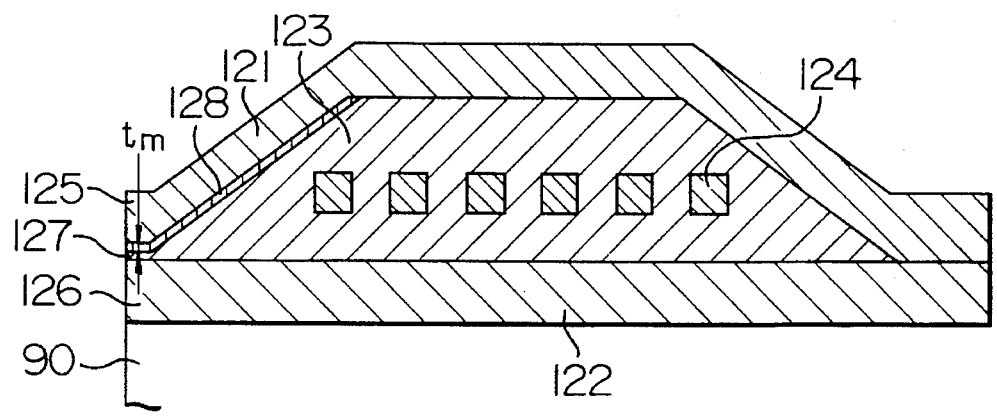
F I G. 13
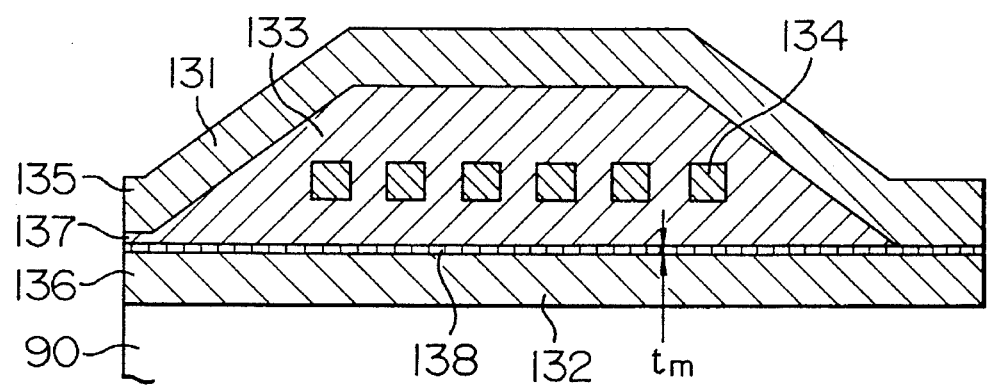
F I G. 14
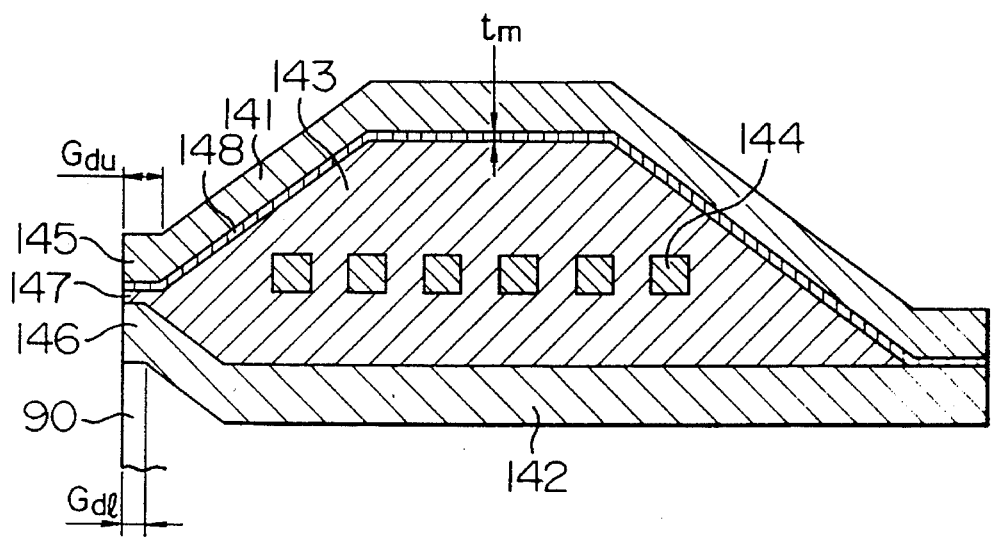

THICKNESS OF ONE LAYER
OF MAGNETIC FILM (nm)

THICKNESS OF ONE LAYER
OF NON-MAGNETIC FILM (nm)

MAGNETIC DISC UNIT HAVING A PLURALITY OF MAGNETIC HEADS WHICH INCLUDE MULTILAYER MAGNETIC FILMS

This application is a continuation of Ser. No. 07/873,219, filed Apr. 24, 1992, now abandoned.

BACKGROUND OF THE INVENTION

The present invention relates to a magnetic disc unit having a thin film magnetic head mounted thereto, and more particularly to a magnetic disc unit capable of realizing high recording density.

In general, a thin film magnetic head has a small inductance and a large reproducing output obtained even for a high frequency, as compared with the prior art bulk type head employing a ferrite core and the like, and therefore, it is a device essential to the promotion of the high recording density of a magnetic disc unit. In recent years, since the promotion of the high coercive force of a recording medium as well as the promotion of the high recording density have been advanced in the magnetic disk unit, it is required for the thin film magnetic head to have a capability of sufficiently recording or reproducing information in or from the recording medium of high coercive force.

One example of the thin film magnetic head is disclosed in JP-A-60-35316 for example. The thin film magnetic head in which an upper magnetic substance is made of a material having larger saturation magnetic flux density than that of a material of a lower magnetic substance is disclosed in JP-A-60-35316 and JP-A-2-126410. The characteristics of the thin film magnetic head employing a magnetic material are disclosed in an article IEEE, TRANSACTIONS ON MAGNETICS, Vol. 25, No. 5 (1989), pp. 3212–3214 for example. The thin film magnetic head employing a magnetic core formed of a multilayer magnetic film in which a magnetic film and a non-magnetic film are alternately laminated is disclosed in JP-A-58-171709.

SUMMARY OF THE INVENTION

It is therefore an object of the present invention to provide a small-sized thin film magnetic head which is capable-of sufficiently recording information in a magnetic medium of high coercive force, minimizes reduction of the reproducing output while increasing a recording magnetomotive force, controls the unstable factors due to magnetic cores, and is capable of recording or reproducing information in a high density fashion, and a magnetic disc unit having the same mounted thereto.

It is another object of the present invention to provide a thin film magnetic head which has the large degree of freedom of selection of a material of high saturation magnetic flux density and is easily designed and manufactured, and a magnetic disc unit having the same mounted thereto.

It is still another object of the present invention to provide a thin film magnetic head which is capable of reducing a decrease of a reproducing output power in the high frequency recording and high speed transfer, and a magnetic disc unit having the same mounted thereto.

The magnetic disc unit serves as a peripheral equipment of a computer to record or reproduce a large quantity of information at high speed to thereby store the information. The principle of the operation thereof is such that a magnetic film of a recording medium is magnetized by the magnetic field generated by a current passing through a coil of the head, and the direction of the magnetization is inverted to record the information, and in the information reproduction, a leakage magnetic field from the magnetic medium is absorbed in a magnetic core of the head so that that magnetic flux links the above coil, and as a result, a voltage output is provided in a terminal of the head by the electromagnetic induction.

Now, since the promotion of the high recording density of the magnetic disc unit and the promotion of the high speed data transfer resulting therefrom have been advanced, the recording frequency is correspondingly increased.

In general, the thin film magnetic head has a small inductance and a large reproducing output obtained even for a high frequency, as compared with the prior art bulk type head employing a ferrite core and the like. Therefore, it is a device essential to promotion of the high recording density of the magnetic disc unit.

It is required for increasing the recording density in the magnetic disc unit that the width of a track in which information is to be recorded is made to be narrower to provide a large number of tracks in a predetermined diameter of the disc, and a large number of flux reversals is provided in a predetermined length of the track.

Then, in the case where the number of flux reversal is increased in the recording medium to increase the recording density, both the length of the magnetization region and the length of the flux reversal region are required to be shortened. However, since the self demagnetizing field serves to weaken the magnetization of the magnetization region itself due to the presence of the magnetization in the both ends of the magnetization region, the length of the flux reversal region becomes long, and the output in the recording of high recording density is lowered. In order to prevent this phenomenon, it is effective that the coercive force of the magnetic film employed for the recording medium is increased to prevent the reduction of the magnetization due to the self demagnetization. Therefore, the coercive force of the employed recording medium has been increased along with the increase in recording density. The coercive force corresponds to the degree of opening of the hysteresis loop of the magnetic film.

Therefore, in correspondence to the promotion of the large coercive force advancing along with the promotion of the high recording density of the magnetic disc unit, it is required for the thin film magnetic head to have the capability of generating a strong recording magnetic field so as to be able to change the magnetization state of a medium having a high coercive force to record the information therein. In order to obtain such a recording capability, there may be considered the following methods: 1) increase the quantity of the magnetic flux emitted from the tip portion of the head by increasing the thickness of the magnetic core of the head; 2) reduce the leakage of the magnetic flux in the magnetic gap by decreasing the depth of the magnetic gap, and as a result, increase the ratio of the magnetic flux emitted from the tip portion; and 3) employ, for the magnetic core, a material having larger saturation magnetic flux density than those of the prior art.

However, in the above method 1), the thickness of the upper magnetic substance is increased, which results in reduction of the accuracy of the narrow-track patterning processing applied to the tip portion of the head after formation of the film. Moreover, the above method 2) also requires precision processing of the gap depth, and as a result, this will be inapplicable to the mass production of the magnetic head.

Further, in the case of the above methods 1) and 2), the present inventors found from their experiments that the reproducing output is decreased as the magnetomotive force expressed in the form of product of the current applied to the head coil and the number of turns of the coil is increased. This phenomenon results from that when the head is magnetized, the magnetic saturation is generated in a portion of the tip portion of the upper magnetic core confronting the magnetic gap. As described above, with the thick pole head corresponding to the medium of high coercive force, the phenomenon will be greater when the throat height is decreased. That is, this results from that the magnetic flux, which has passed through the slope portion of the core of the tip side of the head, concentrates in the tip of the head, especially in the corner portion contacting with the gap film.

There has not been found any attempt to take measures positively to cope with the problem of such a phenomenon of reduction of the reproducing output in the thin film magnetic film corresponding to the promotion of the high recording density.

In the mean time, with respect to the above method 3), i.e., the method of producing the head using a magnetic film having larger saturation magnetic flux density than that of an Ni-Fe series alloy used mainly in the prior art unit, a large number of proposals such as JP-A-60-35316 have been performed. It was found from the analyses by the present inventors that this method is effective in principle for the control of the phenomenon of reduction of the reproducing output in the thin film magnetic film coping with the promotion of the high recording density. However, the permeability of such a material of high saturation magnetic flux density is generally low. Thus, when such a material is used for the thin film magnetic head, there arises a problem in which the magnetic path resistance during the reproducing operation viewed from the tip of the head is large, so that the reproducing efficiency of the head is lowered. If a predetermined reproducing performance is intended to be maintained up to the high recording density, the material of high saturation magnetic flux density should have necessarily the permeability at least similar to that of the prior art magnetic core material, NiFe alloy. As a result, the degree of freedom in selecting an applicable magnetic material becomes small, especially since, regarding the thin film magnetic head requiring the complicated manufacturing process, there has not been found an example in which the magnetic material having high saturation magnetic flux density and high permeability can be actually applied on the industrial base.

Further, it was found in many cases that the thin film magnetic head employing the magnetic material showing high saturation magnetic flux density has a magnetic instability characteristic such as generation of noise due to the characteristics of the magnetic core itself after the recording operation, which is found in the thin film magnetic head having a core made of an Ni-Fe series material, as shown in the article IEEE, TRANSACTIONS ON MAGNETICS, Vol. 25, No. 5 (1989), pp. 3212-3214.

For the above-mentioned problems, the present inventors found the effective solving means by the experiments and the simulation.

More specifically, in the present invention, at least on an inside portion of an upper magnetic core in contact with a magnetic gap layer, a thin magnetic layer made of a material having larger saturation magnetic flux density than that of a magnetic material of each of the remaining portions of the upper magnetic core, and a lower magnetic core is formed, to thereby prevent the magnetic saturation of a tip of a head during the recording operation, and each of the remaining portions of the upper magnetic core and the lower magnetic core is made of a material of high permeability, to thereby secure the efficiency during the reproducing operation.

Furthermore, the high frequency characteristics of the thin film magnetic head for writing or reading the information must be improved as the transfer speed of the data of the magnetic recording unit becomes higher. Then, as for the causes of degrading the high frequency characteristics of the thin film magnetic head, the influences of (1) the eddy current loss and (2) the structure of the magnetic domain are considered.

The eddy current loss is a phenomenon in which the magnetic field does not penetrate into the inside portion of the metallic magnetic film at high frequencies by the skin effect, and therefore, the multilayer magnetic film in which a thin magnetic film and a thin insulating film are alternately laminated is effective to reduce the eddy current loss.

Now, since the characteristics of the thin film magnetic head are closely related with the structure of the magnetic domain, the influence of the size of the magnetic domain is relatively increased as the miniaturization of the head is advanced, so that the control of the structure of the magnetic domain becomes important. Then, it is considered that the magnetization rotation of high speed response is used for the change of the magnetization preferable to the write or read functions, to thereby prevent the change of the structure of the magnetic domain accompanying the movement of the magnetic domain walls of low speed response. In the prior art method, as described in JP-A-58-171709, the multilayer magnetic film in which the magnetic film and the non-magnetic film are alternately laminated is used for the magnetic core, so that the magnetic domain structure is made to be a single magnetic domain. It is expected that in the case of the single magnetic domain, the magnetic flux is passed by only the magnetization rotation, and therefore, the good frequency characteristics are provided and there is no distortion of the signal waveform during the reading operation. It is expected that the multilayer magnetic film in which the magnetic film and the non-magnetic insulating film are alternately laminated is used for the magnetic core, whereby it is possible to remove the influences of (1) the eddy current loss and (2) the structure of the magnetic domain which degrade the high frequency characteristics of the thin film magnetic head. However, there has not been found an example to which such a technique can be applied to thin film magnetic head on an industrial basis. This results from the fact that the reproducing output is deteriorated due to the influence of the edge curling wall inherent in the multilayer magnetic film of which magnetic domain structure is made to be the single magnetic domain. In the method of only using the multilayer film of which magnetic domain structure is made to be the single magnetic domain, it is difficult to realize the above thin film magnetic head coping with the promotion of the high speed transfer on the industrial basis.

Accordingly, in the present invention, the structure of the employed multilayer film is devised to obtain a stable magnetic domain structure.

As described above, the objects of the present invention are attained by applying a magnetic material having high saturation magnetic flux density to only a part of the magnetic cores. More specifically, according to the present invention, there is provided a magnetic disc unit having a thin film magnetic head mounted thereto in which a lower magnetic core and an upper magnetic core form a magnetic circuit; wherein at least in a portion, which is an inside layer of the upper magnetic core and in contact with a magnetic gap layer, a magnetic layer made of a material having larger saturation magnetic flux density than that of a material of each of the remaining portion of the upper magnetic core and a lower magnetic core is formed, and the upper magnetic core or the upper and lower magnetic cores are made of a composite magnetic film.

Further, according to the present invention, there is provided a magnetic disc unit having a thin film magnetic head mounted thereto in which a lower magnetic core and an upper magnetic core form a magnetic circuit through a magnetic gap; wherein at least the upper magnetic core of the thin film magnetic head is constructed by magnetic films of at least two layers, and saturation magnetic flux density $B_{HB1}$ of a magnetic material of the layer of the upper magnetic core in contact with the magnetic gap, one end of the layer being exposed to a face of the thin film magnetic head confronting with a recording medium, saturation magnetic flux density $B_1$ of a magnetic material of the layer of the upper magnetic core not in contact with the magnetic gap layer, and saturation magnetic flux density $B_2$ of a magnetic material of the lower magnetic core are expressed by the following relationships: $B_{HB1} > B_1$, and $B_{HB1} > B_2$.

Further, according to the present invention, there is provided a magnetic disc unit having a thin film magnetic head mounted thereto in which a lower magnetic core and an upper magnetic core form a magnetic circuit through a magnetic gap; wherein each of the upper and lower magnetic cores of the thin film magnetic head is provided, in a portion near a tip, with a ramp portion adjacent to the magnetic gap, and a distance between the tip of the lower magnetic core and a ramp starting position of the lower magnetic core is shorter than a distance between the tip of the upper magnetic core and a ramp starting position of the upper magnetic core.

Further, according to the above aspect of the present invention, there is provided a magnetic disc unit having a thin film magnetic head mounted thereto; wherein the magnetic layer which is formed in the inside portion of the upper magnetic core and made of a material having saturation magnetic flux density Bs different from that of a magnetic material of the remaining portion of the upper magnetic core has a thickness in the range of 0.05 Tp to 0.03 Tp where Tp represents a thickness of the upper magnetic core.

Further, according to the present invention, there is provided a magnetic disc unit having a thin film magnetic head mounted thereto in which a lower magnetic core and an upper magnetic core form a magnetic circuit; wherein at least in a portion near a magnetic gap and inside the upper magnetic core or the whole inside face of the upper magnetic core, a magnetic layer which has larger saturation magnetic flux density than that of a magnetic material each of of the remaining portion of the upper magnetic core and the lower magnetic core and has permeability in the range of 0.05 µ to 1 µ where µ represents permeability of the remaining portion of the upper magnetic core and the lower magnetic core is provided in such a way that one end thereof is exposed to a face of the thin film magnetic head confronting with a recording medium and in contact with the magnetic gap.

Further, according to the present invention, there is provided a magnetic disc unit having a thin film magnetic head mounted thereto including a lower magnetic core, and an upper magnetic core made up of two magnetic layers, one end of the upper magnetic core confronting with the lower magnetic core through a magnetic gap, the other end thereof being connected to the lower magnetic core; wherein saturation magnetic flux density $B_{HB1}$ and permeability $\mu_{HB1}$ of the magnetic layer of the upper magnetic core in contact with the magnetic gap, saturation magnetic flux density $B_1$ and permeability $\mu_1$ of the magnetic layer of the upper magnetic core not in contact with the magnetic gap, and saturation magnetic flux density $B_2$ and permeability $\mu_2$ of the lower magnetic core are expressed by the following relationships: $B_{HB1} > B_1$, $B_{HB1} > B_2$, $\mu_1 \geq \mu_{HB1} \geq 0.05\ \mu_1$, and $\mu_2 \geq \mu_{HB1} \geq 0.05\ \mu_2$.

Furthermore, according to the present invention, there is provided a magnetic disc unit having a thin film magnetic head mounted thereto including a lower magnetic core made up of two magnetic layers, and an upper magnetic core made up of two magnetic layers, one end of the upper magnetic core confronting with the lower magnetic core through a magnetic gap, the other end thereof being connected to the lower magnetic core; wherein saturation magnetic flux density $B_{HB1}$ and permeability $\mu_{HB1}$ of the magnetic layer of the upper magnetic core in contact with the magnetic gap, saturation magnetic flux density $B_1$ and permeability $\mu_1$ of the magnetic layer of the upper magnetic core not in contact with the magnetic gap, saturation magnetic flux density $B_{HB2}$ and permeability $\mu_{HB2}$ of the magnetic layer of the lower magnetic core in contact with the magnetic gap, and saturation magnetic flux density $B_2$ and permeability $\mu_2$ of the magnetic layer of the lower magnetic core not in contact with the magnetic gap are expressed by the following relationships, respectively: $B_{HB1} > B_1$, $B_{HB2} > B_2$, $B_{HB1} > B_{HB2}$, $\mu_1 \geq \mu_{HB1} \geq 0.05\ \mu_1$, and $\mu_2 \geq \mu_{HB2} \geq 0.05\ \mu_2$.

Moreover, according to the above aspect of the present invention, there is provided a magnetic disc unit having a thin film magnetic head mounted thereto, the magnetic disc unit comprising: a non-magnetic layer provided between the magnetic layer, which is the most inside layer of the upper or lower magnetic core in contact with the magnetic gap and of which one end is exposed to a face confronting with a recording medium and saturation magnetic flux density is different from that of the remaining portion of the upper or lower magnetic core, and the remaining portion of the upper or lower magnetic core.

Moreover, according to the present invention, there is provided a magnetic disc unit having a thin film magnetic head mounted thereto including a lower magnetic core, an upper magnetic core formed on the lower magnetic core through an insulating film and forming together with the lower magnetic core a magnetic circuit through a magnetic gap, one end of the upper magnetic core confronting with the lower magnetic core through the magnetic gap, the other end thereof being connected to the lower magnetic core, and a coil made of a conductor film formed between the lower and upper magnetic cores. Accordingly the lower magnetic core is constructed by laminating alternately a magnetic film having saturation magnetic flux density $B_2$ and a non-magnetic insulating film up to two or more layers. A portion of the upper magnetic core on the side of the magnetic gap is made of a magnetic film having saturation magnetic flux density $B_{HB1}$, a portion of the upper magnetic core opposite to the magnetic gap is constructed by laminating alternately a magnetic film having saturation magnetic flux density $B_1$ and a non-magnetic insulating film up to two or more layers, and the saturation magnetic flux density $B_{HB1}$, $B_1$ and $B_2$ are expressed by the following relationships, respectively: $B_{HB1} > B_1$, and $B_{HB1} > B_2$.

Moreover, according to the above aspect of the present invention, there is provided a magnetic disc unit having a thin film magnetic head mounted thereto; wherein a thickness of the insulating film constituting each of the upper and lower magnetic cores is in the range of 10 to 50 nm per layer.

Moreover, according to the above aspect of the present invention, there is provided a magnetic disc unit having a thin film magnetic head mounted thereto; wherein a thickness of each of the magnetic films having the respective saturation magnetic flux density $B_1$ and $B_2$ is in the range of 200 to 2000 nm per layer.

Further, according to the above aspect of the present invention, there is provided a magnetic disc unit having a thin film magnetic head mounted thereto; wherein each of the non-magnetic insulating films constituting the upper and lower magnetic cores, respectively, is made of $Al_2O_3$, $SiO_2$, $ZrO_2$, SiN, TiC, $Y_2O_3$, BN, $Ta_2O_5$ or a mixed material thereof.

Further, according to the above aspect of the present invention, there is provided a magnetic disc unit having a thin film magnetic head mounted thereto; wherein a material of the remaining portion of the upper and lower magnetic core is mainly Ni-Fe, and a magnetic film which is the most inside layer of the upper magnetic core and in contact with the magnetic gap and of which one end is exposed to a face confronting with a recording medium and which is made of a magnetic alloy material of saturation magnetic flux density $B_{HB1}$ which is different in saturation magnetic flux density Bs or permeability $\mu$ from that of a magnetic material of the remaining portion of the upper magnetic core and contains one constituent as the main constituent selected from the group consisting of, for example, Co-Ni-Fe-Pd four element series crystalline material, Co-Ni-Fe-three element series crystalline material, or Co-Hf-Ta-Pd four element series amorphous material, Co-Ta-Zr three element series amorphous material, and Fe-Al-Si three series crystalline material, Fe-Ta-C three element series crystalline material, and Fe-Si, Fe-Ge, Fe-Ti, Fe-N, Co-Fe, Co-Zr, Co-Ti.

Further, according to the present invention, there is provided a magnetic disc unit having a thin film magnetic head mounted thereto in which a lower magnetic core and an upper magnetic core form a magnetic circuit; wherein, in a region in which the ratio of the quantity of initial recording signal remaining unerased to the quantity before the superimposition recording (i.e., the overwrite erase performance) when a signal initially recorded by the thin film magnetic head is subsequently superimposed with a signal having a shorter wavelength than that of the former is 20 dB or more, a reproducing output, after the recording by the signal of shorter wavelength used for the overwrite, is 0.9 or more of the output maximum value when a recording current is variable.

Furthermore, according to the present invention, there is provided a magnetic disc unit having a thin film magnetic head mounted thereto; wherein in the most inside portion of an upper magnetic core, of the thin film magnetic head used as a recording head, in contact with a magnetic gap, the recording head constituting a head having independent recording/reproducing function and also used as a reproducing head by utilizing a magneto resistive effect, a magnetic layer made of a material having larger saturation magnetic flux density than that of a material of the other portion of the recording head is provided so as for one end thereof to be exposed to a face of the head confronting with a recording medium.

The reasons for being able to solve the main problem, which is an object of the present invention, by the above-mentioned means are based on the following operation of the present invention.

First, with respect to the reduction of the reproducing output during the increase in magnetomotive force, the phenomenon will hereinbelow be arranged again.

In the case of the thin film magnetic head coping with the high recording density in which the promotion of increase of the thickness of the magnetic substance of the above-mentioned thin film magnetic head core or the shortening of the depth of the magnetic gap is taken, there is shown a tendency in which when that head is magnetized, the magnetic saturation starts in a portion of the tip of the upper magnetic core confronting with the magnetic gap, and the gradient of the magnetic field of the recording magnetic field distribution spreading over the tip of the head, on the side of the upper magnetic core, becomes less sharp as the recording current is increased. Since in the normal thin film magnetic head, the head is carried by the outflow portion in the rear portion of the slider, the upper magnetic core side becomes the trailing side for determining the recording of information in the medium. Thus, the gradient of that magnetic field is, together with the magnetic characteristics of the medium, the important factor for determining the rapidity of the flux reversal recorded in the medium. That is, in the case where the magnetic characteristics of the medium are fixed, the rapidity of the flux reversal becomes poor as the gradient of the recording magnetic field on the side of the upper magnetic core of the head is more gentle. Thus, when the recording magnetization signal is reproduced, the half-value width of the output waveform which is obtained in correspondence to the flux reversal spreads. Especially, when the information was recorded with the high recording density, the reproducing output is remarkably reduced. Therefore, in the case of the thin film magnetic head coping with the high recording density in which the promotion of increase of the thickness of the magnetic substance or the shortening of the depth of the magnetic gap is taken, as described above, when the head is magnetized, the gradient of the magnetic field of the recording magnetic field distribution spreading over the tip of the head, on the side of the upper magnetic core, becomes sharp as the recording current is more increased. Therefore, there is shown a tendency in which the reproducing output is also reduced as the recording current is increased. As a result, there is the possibility that it is difficult for the head to cope with the high recording density.

Moreover, for the promotion of the high recording density, in order to reduce the gap loss in the magnetic gap of the head, the shorter the length of the gap is, the better it is, on the other hand, the magnetic saturation readily occurs in the portion of the tip of the upper magnetic core confronting with the magnetic gap and the reduction of the reproducing output during the increase of the recording current is more readily generated, as the length of the gap decreases. As a result, the possibility that the promotion of the high recording density is remarkably hindered is increased.

As described above, it is readily understood that in order to prevent the decrease of the reproducing output during the increase of the magnetomotive force, the magnetic saturation in the portion of the tip of the upper magnetic core confronting with the magnetic gap may be controlled. Such magnetic saturation in the tip of the upper magnetic core is effectively controlled by increasing the saturation magnetic flux density in that portion.

Next, the description will be given to the control of the unstable factors of the magnetic characteristics themselves of the magnetic film of the magnetic core.

As an example of a material of high saturation magnetic flux density for the magnetic core of the thin film magnetic head, there is known a Co-Ta-Zr series amorphous material with a saturation magnetic flux density Bs of about 1.3 tesla. When such a material is used for the magnetic head, even if the recording medium is not used, there is found the phenomenon in which immediately after the exciting current corresponding to the recording operation is caused to flow through the head coil, the head generates a signal. Since this false signal shows the magnitude approximately equal to that of the normal reproducing signal and also the time of occurrence thereof is uncertain, it becomes a fatal defect of the magnetic disc unit. This phenomenon is such that after the magnetic core is magnetized near the saturation and the recording current is then turned off, a small change in magnetic flux is generated in the magnetic core, and as a result, a small voltage is induced in the coil to be the reproducing signal. Then, the theory is powerful in which such a small change of the magnetic flux is induced by the change of the magnetic domain in the magnetic core. More specifically, when the magnetic anisotropy of the magnetic film of the magnetic core is non-uniform, the pinning sites of the magnetic domain walls are readily generated in the magnetic core. When the recording current is turned off immediately after the recording current has been applied, the structure of the magnetic domain cannot be immediately returned to the energy minimum state due to the presence of the pinning sites in the magnetic core and then gets into the energy minimum state after a certain time lag. Then, it is considered that when the magnetic domain walls are trapped in the pinning sites to be off the pinning sites, there is provided in the magnetic core the change of the magnetic flux which is detected in the form of voltage.

In order to control such a phenomenon, there may be devised the following methods: 1) form the magnetic core of a stable magnetic material which causes less phenomenon relating to the essential matters; 2) form most of the magnetic core of a stable magnetic material which shows less phenomenon relating to the essential matters to provide a composite magnetic film laminating structure which can utilize only the characteristics of high saturation magnetic flux density of such an unstable material; and so forth. In the method 1), the application of a Co-Ni-Fe-Pd series crystalline material for example may be considered. However, such a material has the disadvantage in which its saturation magnetic flux density is higher than that of an Ni-Fe series crystalline material used for the usual thin film head, whereas its permeability $\mu$ is low. In the present circumstances, there is not found such a reliable magnetic material for the thin film magnetic head as to have high saturation magnetic flux density, high permeability and a high corrosion resistance and be applicable to the magnetic core in the form of simple substance. On the other hand, as in the method 2), if the head structure is constructed in such a way that the above Co-Ni-Fe-Pd series crystalline material or the like is combined with an Ni-Fe series crystalline material of high permeability for example to compensate for the influence of the low permeability, the unstable factors of the magnetic core itself are controlled, and as a result, the objects of the present invention are substantially attained. That is, it was certified from the trial production that when the composite magnetic film lamination structure is constructed in such a way that a little amount of Co-Ta-Zr series amorphous material for example is added to the inside portion of the upper magnetic core made of an Ni-Fe series crystalline material, after the above recording operation, the false signal is hardly generated. This is considered to result from that the instability inherent in the material of high saturation magnetic flux density is suppressed by the volume superiority of the stable material.

Next, with respect to the degradation of the high frequency characteristics of the thin film magnetic head, the mechanism thereof will hereinbelow be arranged.

The degradation due to the eddy current loss can be solved by employing the multilayer magnetic film in which the thin magnetic film and the thin insulating film are alternately laminated.

In the thin film magnetic head in which the multilayer magnetic film is used for the magnetic core, the degradation of the high frequency characteristics due to the structure of the magnetic domain is considered to be influenced by the edge curling wall inherent in the multilayer magnetic film of which structure of the magnetic domain is made to be the single magnetic domain. Since, in the edge curling wall formed in the side end of the magnetic core, the direction of the magnetization is inclined with the easy axis of magnetization, the magnetic flux is hard to pass therethrough. Then, the thickness of the magnetic film of the multilayer magnetic film per layer is increased so that the structure of the magnetic domain is made to be a closure magnetic domain structure. Since no edge curling wall is present in the closure magnetic domain structure, there is no degradation of the high frequency characteristics due to the edge curling wall.

If the thickness of the magnetic film of the multilayer magnetic film per layer is increased too much, the eddy current loss is correspondingly increased. Conversely, if it is decreased too much, the structure of the magnetic domain is made to be the single magnetic domain. Therefore, the thickness of the magnetic film per layer is preferably between 200 and 2000 nm.

If the thickness of the insulating film of the multilayer magnetic film per layer is decreased too much, pin holes might be formed in the insulating film to allow the magnetic films between which the insulating film is sandwiched to contact, so that the eddy current loss is increased. On the other hand, if it is increased too much, the insulating film acts as a pseudo-gap to degrade the reproducing characteristics. Then, the thickness of the insulating film per layer is preferably between 10 and 50 nm.

According to the present invention, since when the recording current is caused to flow through the thin film conductor coil to magnetize the thin film magnetic head, the magnetic saturation is generated, prior to the tip of the upper pole, in the tip of the lower pole with a small current, the gradient of the recording magnetic field on the side of the upper pole is kept approximately constant while being relatively steep even if the recording current is increased. Therefore, the gradient of the recording magnetic field on the side of the trailing is kept approximately constant while being relatively steep. As a result, the amount of decrease of the reproducing output in the increase of the magnetomotive force can be readily reduced to 10% or less of the output maximum value.

Moreover, in the magnetic disc unit having the thin film magnetic head of the present invention, even if the recording current is increased to record the information in the recording medium having a high coercive force, the reduction of the reproducing output is substantially prevented. As a result, the adjustment of the recording current for every head becomes unnecessary or is simplified. For example, the variable resistor unit for adjusting the recording current becomes unnecessary, and as a result, the circuit configuration of the magnetic disc unit is simplified and miniaturized.

Moreover, according to the present invention, since in the thin film magnetic head, the recording magnetic field can be effectively generated in the tip of the head, the recording/reproducing operation can be sufficiently performed even in the magnetic disc having a coercive force of 1.6 kOe.

Moreover, according to the present invention, by only adding a little amount of magnetic material of high saturation magnetic flux density to the inside portion of the upper magnetic core for example, the above effect can be obtained. Therefore, the instability, such as a noise-after-write, inherent in the magnetic material of high saturation magnetic flux density, can be suppressed by the superiority in volume of the stable material such as Fe-Ni. Thus, it is possible to embody a high recording density magnetic disc unit having a thin film magnetic head mounted thereto in which the unstable factors of the magnetic film itself of the magnetic core are controlled.

Further, according to the present invention, by only adding a little amount of magnetic core material of high saturation magnetic flux density to the inside portion of the upper magnetic core for example, the effect of reduction of the reproducing output in the increase of the magnetomotive force and the effect of elimination of the unstable factors of the magnetic core itself can be obtained simultaneously. Also, by utilizing the volume superiority of the magnetic material of high permeability, such as Fe-Ni, used for the magnetic core, there is provided the effect in which even if the permeability of the magnetic core material of high saturation magnetic flux density is $1/20$ or so of that of Fe-Ni, the degree of freedom of selection of the magnetic core material of high saturation magnetic flux density can be largely increased without hindrance.

Furthermore, according to the present invention, since the thickness of the magnetic film of the multilayer magnetic film constituting the magnetic core every layer is small, when the frequency of the recording current caused to flow through the thin film conductor coil is increased, the decrease of the recording magnetic field due to the eddy current loss can be reduced, and the reduction of the reproducing output in the high speed transfer can be controlled. Thus, it is possible to embody a high recording density magnetic disc unit.

DESCRIPTION OF THE DRAWINGS

FIG. 12 is a cross sectional view showing one embodiment of the present invention;

FIG. 13 is a cross sectional view showing one embodiment of the present invention;

FIG. 14 is a cross sectional view showing one embodiment of the present invention;

DESCRIPTION OF THE PREFERRED EMBODIMENTS

The preferred embodiments of the present invention will hereinafter be described in detail with reference to the accompanying drawings.

Figure 1:
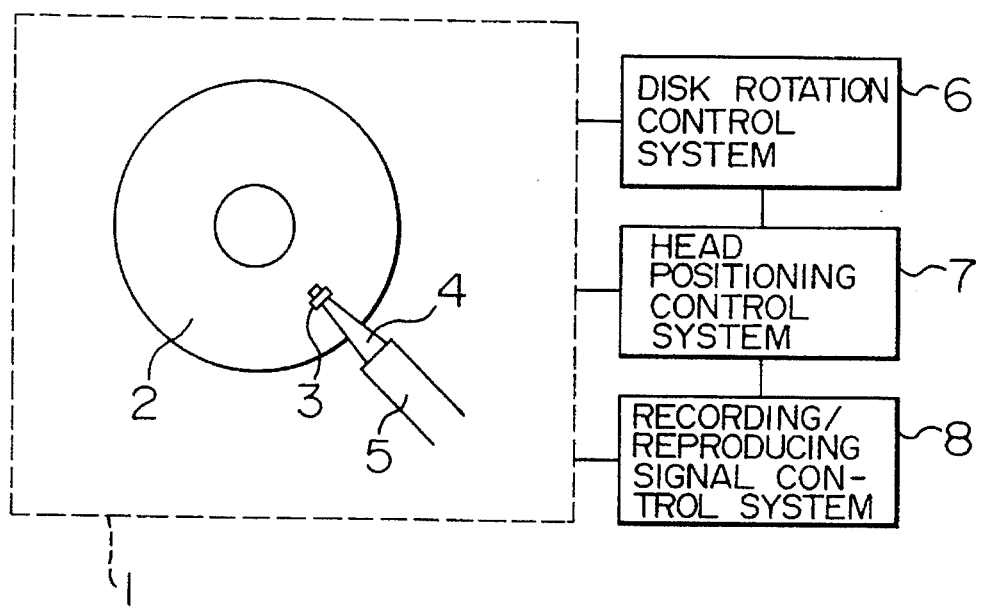
FIG. 1 is a conceptual diagram useful in explaining the outline of a magnetic disc unit.

FIG. 1 is a conceptual diagram showing a magnetic disc unit having a thin film magnetic head mounted thereto of the present invention. In FIG. 1, the reference numeral 1 designates a head-disc assembly. The head-disc assembly 1 is made up of a magnetic disc 2 having a recording medium formed therein to the surface of which is recorded information, a head slider 3 in which a magnetic head for recording and reproducing the information is formed, a spring member 4 to which the head slider 3 is mounted and which serves to stably maintain a submicron-space between the rotating magnetic disc and the head slider, and a guide arm 5 which serves to fix the spring member thereto and is connected to a positioning mechanism. The above head-disc assembly 1, a disc rotation control system 6, a head positioning control system 7, and a recording/reproducing signal control system 8 are combined with one another to construct the basic arrangement of the above magnetic disc unit.

Figure 2:
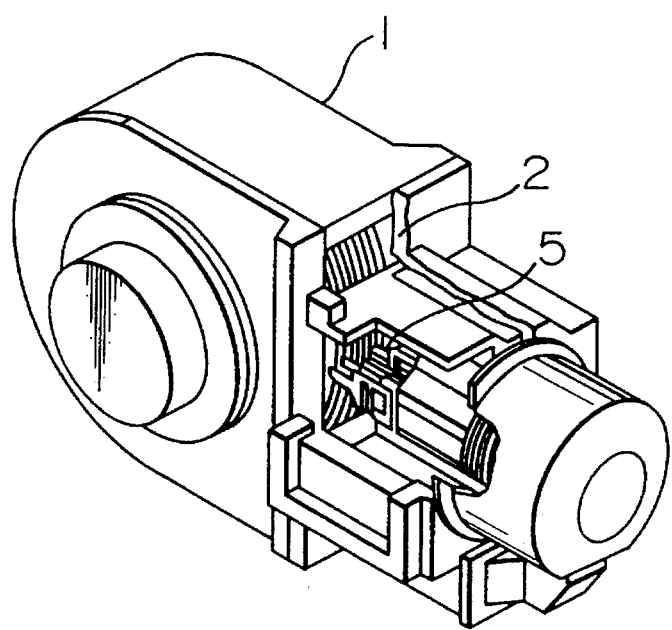
FIG. 2 is a perspective view showing the appearance of a head-disc assembly.

FIG. 2 is a perspective view showing the appearance of the head-disc assembly.

Figure 3:
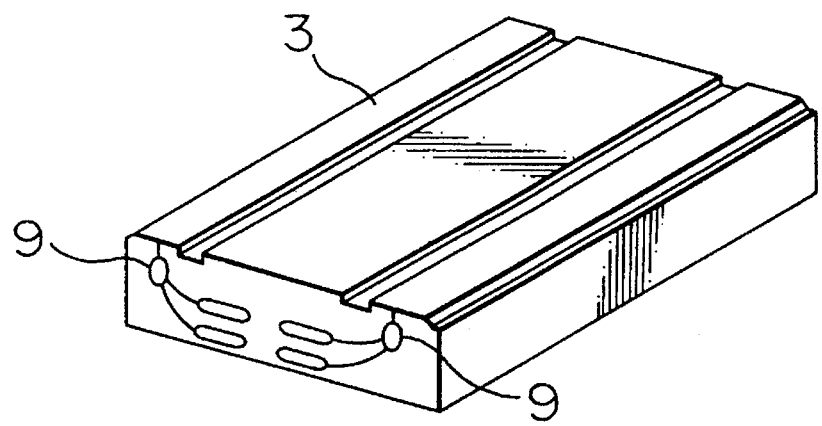
FIG. 3 is a perspective view showing the schematic appearance of a slider having a thin film magnetic head formed therein.

FIG. 3 is a perspective view showing the schematic appearance of the head slider 3. In FIG. 3, a thin film magnetic head 9 is formed in the rear side face which forms an air outflow end of the head slider 3.

Figure 4:
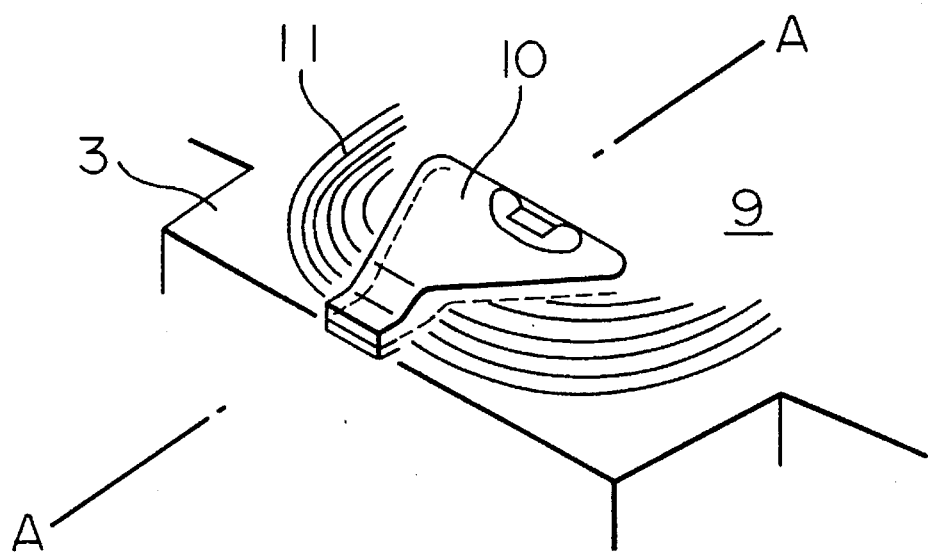
FIG. 4 is a partially enlarged perspective view showing the schematic appearance of the thin film magnetic head.

FIG. 4 is a partially enlarged perspective view showing the schematic appearance of the thin film magnetic head 9 formed in the head slider 3. In FIG. 4, the thin film magnetic head 9 is constructed in such a way that the tip of a magnetic core 10 is exposed as a pole (magnetic pole) to a floating surface of the head slider 3. The magnetic core 10 is formed in such a way as to hold a conductor coil 11 on a non-magnetic substrate of the slider 3 by performing cut and processing after completion of the head and the magnetic core 10.

Figure 5A:
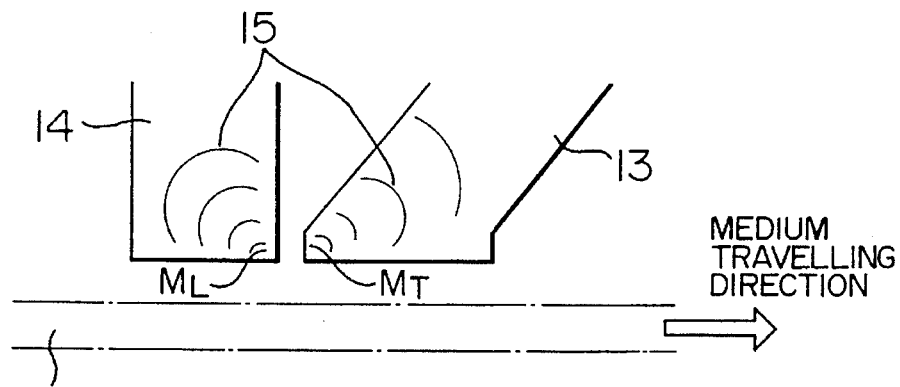
FIG. 5(a) and 5(b) are view useful in explaining the basic principle of the present invention.
Figure 5B:
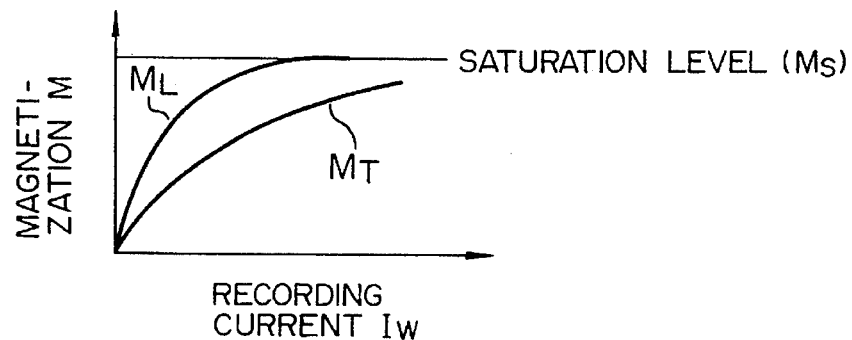

FIG. 5(a) is a view useful in explaining the basic principle of the present invention. In FIG. 5(a), the reference numerals 13 and 14 respectively designate a trailing pole and a leading pole of the tip of the magnetic core 10 of the thin film magnetic head, with respect to the travelling direction (in the figure, indicated by an arrow) of the magnetic medium 2 confronting with the head. In the figure, there is shown the cross section of the tip of the magnetic core of the thin film magnetic head (the shape of the tip of the head taken on the line A—A of FIG. 4). The reference numeral 15 designates the distribution of the magnetization in each of the insides of the cores when the head is being magnetized. Then, the distribution of the magnetization is schematically illustrated. As shown in FIG. 5(a), the cross section of the tip of the lower pole is a rectangle, whereas with the upper pole, when viewed with the slope of the ramp portion as the reference, the tip of the pole is tapered by the exposed portion of the floating surface of the pole and the gap facing surface, so that it is formed into a shape sharp-pointed towards the corner portion of the exposed portion of the floating surface of the pole and the gap facing surface. Therefore, in the case of the prior art head, with such a construction, in the process of increase of a recording current Iw, the magnetization $M_T$ of the tip of the magnetic core of the trailing side reaches the saturation level (Ms) with a small current before the magnetization $M_L$ of the tip of the magnetic core of the leading side. Therefore, the gradient of the writing magnetic field of the trailing side in the position of the recording medium is slowed down in rate as the recording current is more increased, the length of the flux reversal region formed in the recording medium becomes long, and as a result, as described above, the reproducing output is decreased. In the present invention, such a relationship between the magnetization $M_T$ of the tip of the magnetic core of the trailing side and the magnetization $M_L$ of the tip of the magnetic core of the leading side is reversed as shown in FIG. 5(b) to promote the reduction of the decrease of the reproducing output arising along with the increase of the recording current. That is, as shown in FIG. 5(b), the unit is basically designed in such a way that in the process of increase of the recording current, the magnetization $M_T$ of the tip of the magnetic core of the trailing side reaches the saturation level of the magnetic film with a larger current after the magnetization $M_L$ of the tip of the magnetic core of the leading side.

Figure 6A:
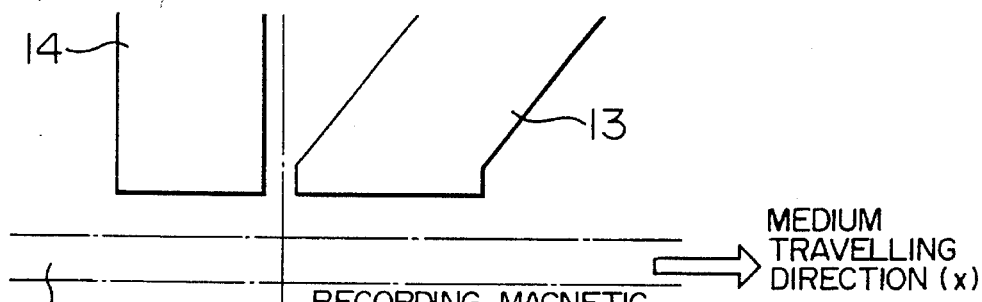
FIG. 6(a) and 6(b) are views useful in explaining the basic principle of the present invention.
Figure 6B:
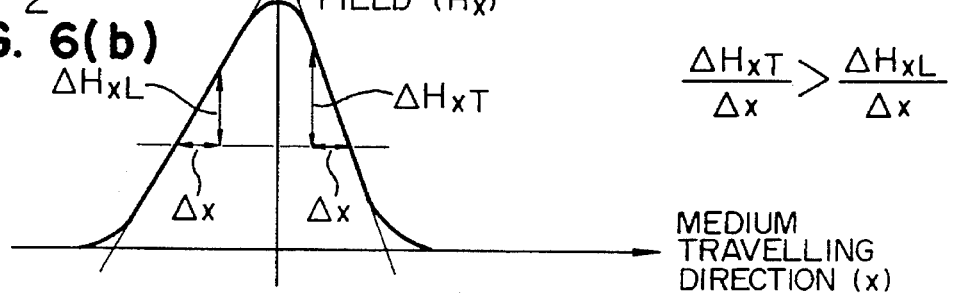

FIG. 6 is also a view useful in explaining the basic principle of the present invention in a similar manner to FIG. 5. In FIG. 6(a), the reference numerals 13 and 14 respectively designate the trailing side and the leading side of the tip of the magnetic core 10 of the thin film magnetic head with respect to the travelling direction of the magnetic medium 2 confronting with the head. In the figure, the cross section of the tip of the magnetic core is illustrated. As described above, since the tip of the upper pole is tapered into the sharp-pointed shape by the exposed portion of the floating surface of the pole and the gap facing surface when viewed with the slope of the ramp portion as the reference, the tip readily reaches the magnetic saturation. From the point of view of the current value in recording information, the gradient of the writing magnetic field $\Delta H_{xt}/\Delta X$ of the trailing side is smaller than that $\Delta H_{xl}/\Delta X$ of the leading side, and the length of the flux reversal region formed in the recording medium becomes long. This results in the decrease of the reproducing output. In the present invention, such a relationship between the gradient of the writing magnetic field $\Delta H_{xt}/\Delta X$ of the trailing side and that $\Delta H_{xl}/\Delta X$ of the leading side is reversed as shown in FIG. 6(b) to promote the reduction of the decrease of the reproducing output arising along with the increase of the recording current.

Figure 7A:
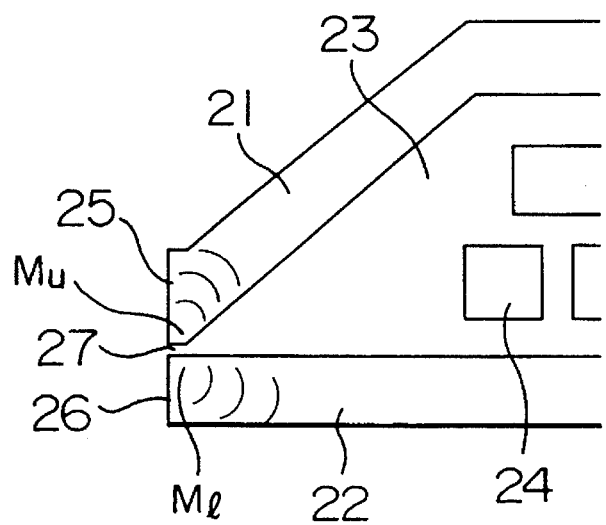
FIG. 7A is a view useful in explaining the basic principle of the present invention.
Figure 7B:
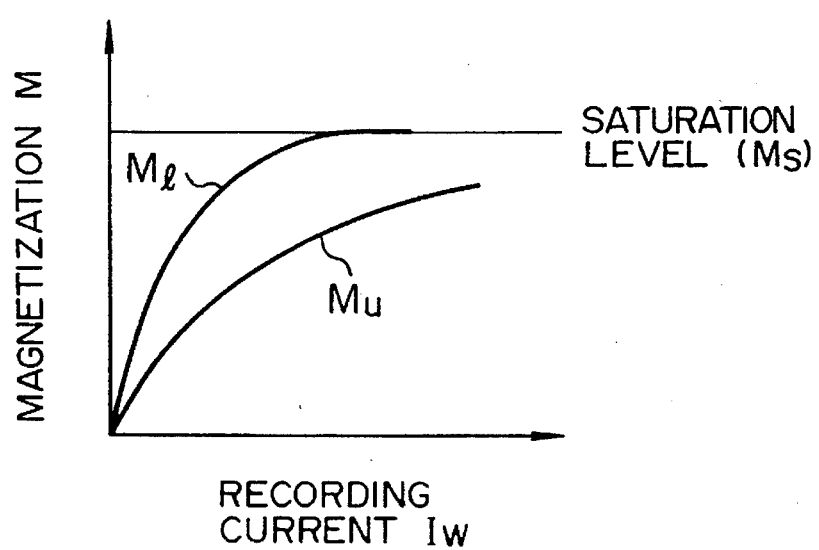
FIG. 7B is a graphical representation showing the relationship between a recording current and magnetization.

FIG. 7A and FIG. 7B are views useful in performing consideration in a state in which the trailing pole and the leading pole, which are assigned thereto with respect to the travelling direction of the magnetic medium, correspond to the upper magnetic core and the lower magnetic core of the thin film magnetic head, respectively. In FIG. 7A, the reference numerals 21 and 22 respectively designate an upper magnetic core and a lower magnetic core each of which is made of an Ni-Fe series material. Moreover, the reference numeral 23 designates a non-magnetic insulating layer which is made of an organic material, such as a photoresist, and fills a space between the upper magnetic core and the lower magnetic core, and the reference numeral 24 designates a coil which is made of a metallic conductor, such as Cu, and serves to magnetize the thin film magnetic head. Further, the tip portions of the upper magnetic core 21 and the lower magnetic core 22 provided in a medium facing portion of the tip of the thin film magnetic head, i.e., an upper pole 25 and a lower pole 26 confront with each other through a magnetic gap 27 made of a non-magnetic insulating material of a ceramic material such as alumina. Moreover, the reference symbols Mu and Ml respectively designate distributions of magnetization in the insides of the upper and lower magnetic cores when the head is magnetized. Then, the distributions of magnetization Mu and Ml are schematically illustrated. In the prior art head, with such a construction, in the process of increase of the recording current (Iw), the magnetization Mu of the tip of the upper magnetic core reaches the saturation level (Ms) with a smaller current before the magnetization Ml of the tip of the lower magnetic core. Therefore, the gradient of the writing magnetic field of the upper core side is slowed down in rate as the recording current is more increased. This results in the decrease of the reproducing output. In the present invention, such a relationship between the magnetization Mu of the upper magnetic core and the magnetization Ml of the lower magnetic core is reversed as shown in FIG. 7B to promote the reduction of the decrease of the reproducing output following the increase of the recording current. That is, as shown in FIG. 7B, the unit is basically designed in such a way that in the process of increase of the recording current, the magnetization Mu of the tip of the upper core reaches the saturation level with a larger current after the magnetization Ml of the tip of the lower magnetic core. Although the description has been given to the specific case where the saturation level is fixed between the upper and lower poles, referring to FIG. 5 to FIGS. 7A and 7B, the present invention is not necessarily limited thereto or thereby. For example, the unit may be constructed in such a way that different magnetic materials are respectively used for the trailing pole,(or the upper core side) and the leading pole (or the lower core side) to provide different saturation levels. According to the spirit of the present invention, it is readily understood that the magnetic material of the portion of the pole of the trailing side in contact with the magnetic gap has a higher saturation level than that of the remaining portion.

Figure 8:
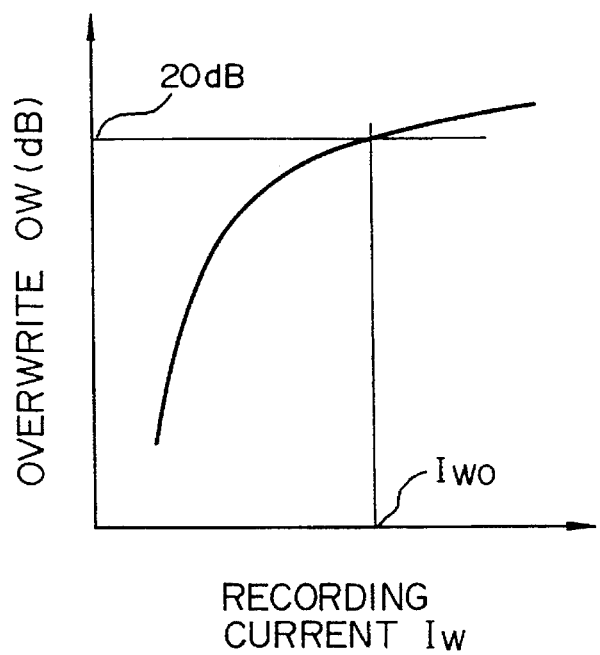
FIG. 8 is a graphical representation showing the relationship between a recording current and an overwrite performance of the present invention.
Figure 9:
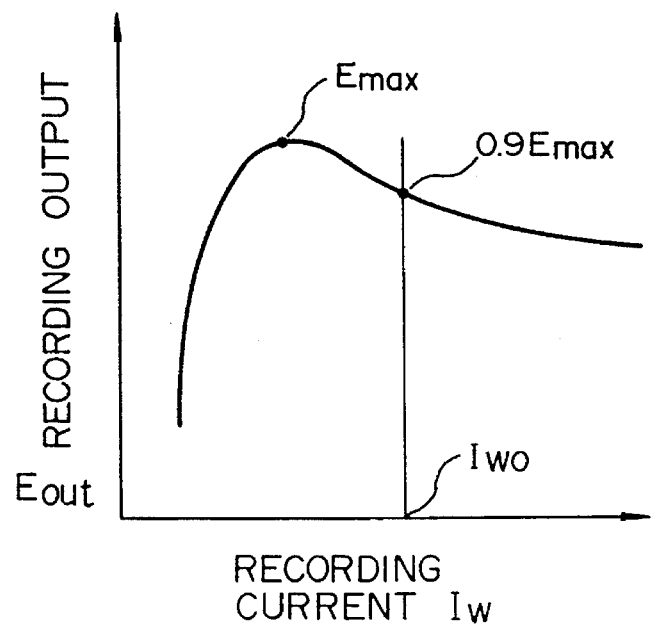
FIG. 9 is a graphical representation showing the relationship between the recording current and a reproducing output of the present invention.

FIG. 8 and FIG. 9 are graphical representations each showing one example of recording and reproducing characteristics in the case where the thin film magnetic head according to the present invention is mounted to the magnetic disc unit. FIG. 8 is a graphical representation showing the relationship between an overwrite performance and the recording current (Iw) which is an index of the recording characteristics. Moreover, FIG. 9 is a graphical representation showing the relationship between the reproducing output (Eout) and the recording current (Iw). With such recording and reproducing characteristics, the present invention embodies the thin film magnetic head in which the reproducing output can maintain 90% or more of the maximum value Emax with a recording current Iwo at which 20 dB or more of the overwrite performance can be secured.

Figure 10:
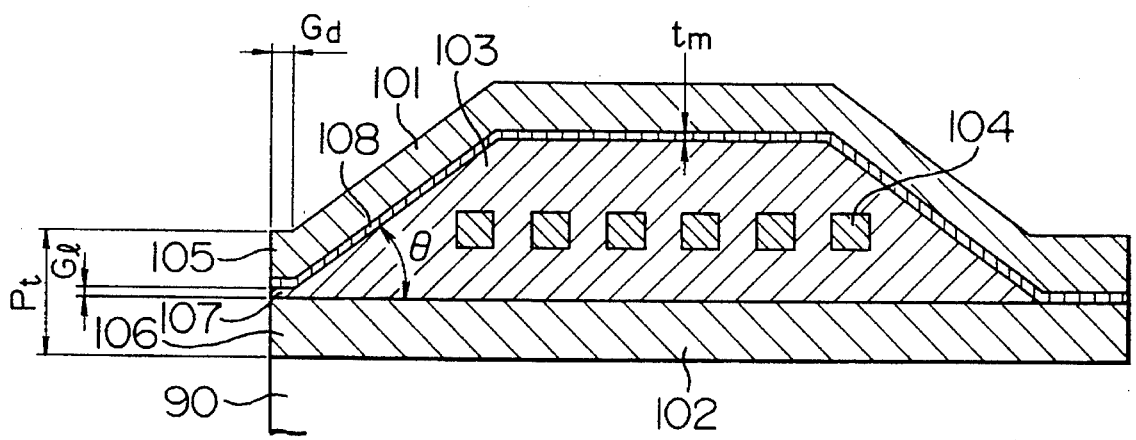
FIG. 10 is a cross sectional view showing one embodiment of the present invention.

FIG. 10 is a cross sectional view showing the construction of a core portion near the tip of the thin film magnetic head of one embodiment of the present invention which is to be mounted to the magnetic disc unit. In FIG. 10, the reference numerals 101 and 102 respectively designate an upper magnetic core and a lower magnetic core, each of which is made of an Ni-Fe series material. Moreover, the reference numeral 103 designates a non-magnetic insulating layer which is made of an organic material such as a photoresist and fills a space between the upper magnetic core and the lower magnetic core, and the reference numeral 104 designates a coil which is made of a metallic conductor such as Cu and serves to magnetize the thin film magnetic head. Further, the tips of the upper magnetic core 101 and the lower magnetic core 102, which are provided in the medium facing portion of the tip of the thin film magnetic head, i.e., an upper pole 105 and a lower pole 106, confront with each other through a magnetic gap 107 which is made of a non-magnetic insulating material of a ceramic material such as alumina. The lower magnetic core 102 is formed on a substrate 90.

The constructional feature of the present thin film magnetic head is that a thin film magnetic substance 108 having a larger saturation magnetic flux density than that of each of the magnetic cores 101 and 102 is formed on a surface, which is the inside portion of the upper magnetic core 101 and faces the non-magnetic insulating layer 103, by a predetermined thickness of tm. The thin film magnetic substance 108 is preferably made of a Co-Ni-Fe-Pd series crystalline material, a Co-Ta-Zr series amorphous material, or the like for example. With such a construction, in the process of increasing the recording current, the magnetization of the tip of the upper magnetic core reaches the saturation level of the magnetic film with a larger current after the magnetization of the tip of the lower magnetic core. Therefore, the gradient of the writing magnetic field of the upper pole side becomes larger than that of the magnetic field of the lower pole side, and as a result, it is possible to promote the reduction of the decrease of the reproducing output following the increase of the recording current.

Figure 11:
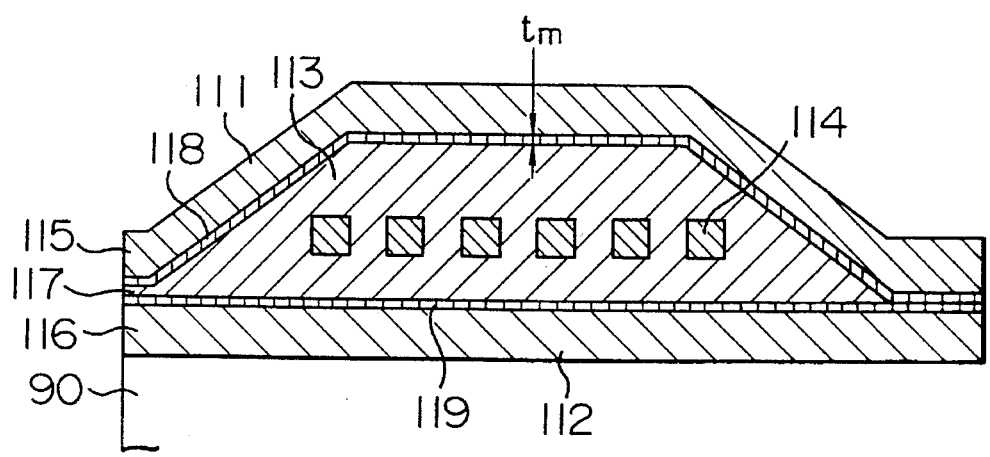
FIG. 11 is a cross sectional view showing one embodiment of the present invention.

FIG. 11 is a cross sectional view showing the construction of a core portion near the tip of the thin film magnetic head of another embodiment of the present invention which is to be mounted to the magnetic disc unit. In FIG. 11, the reference numerals 111 and 112 respectively designate a part of an upper magnetic core and a part of a lower magnetic core each of which is made of an Ni-Fe series material. Moreover, the reference numeral 113 designates a non-magnetic insulating layer which is made of an organic material such as a photoresist and fills a space between the upper magnetic core and the lower magnetic core, and the reference numeral 114 designates a coil which is made of a metallic conductor such as Cu and serves to magnetize the thin film magnetic head. Further, the tips of the upper magnetic core 111 and the lower magnetic core 112, which are provided in the medium facing portion of the tip of the thin film magnetic head, i.e., an upper pole 115 and a lower pole 116 confront with each other through a magnetic gap 117 which is made of a non-magnetic insulating material of a ceramic material such as alumina.

The constructional feature of the present thin film magnetic head is that a thin film magnetic substance 118 having larger saturation magnetic density $B_{HB1}$ than that of the upper magnetic core 111 is formed on a surface, which is the inside portion of the upper magnetic core 111 and faces the non-magnetic insulating layer 113, by a predetermined thickness of $tm_1$, and a thin film magnetic substance 119 having saturation magnetic flux density $B_{HB2}$ more than or equal to saturation magnetic flux density B2 of the lower magnetic core 112 is formed on a surface of the lower magnetic core 112, which faces the non-magnetic insulating layer 113, by a predetermined thickness of $tm_2$. Further, the constructional feature of the present thin film magnetic head is that the saturation magnetic flux density $B_{HB1}$ of the thin film magnetic substance 118 is made to be larger than the saturation magnetic flux density $B_{HB2}$ of the thin film magnetic substance 119. As in such a construction, the thin film magnetic substances 118 and 119 are respectively formed on the facing surfaces of the magnetic cores 111 and 112 to increase the saturation levels of both the upper and lower magnetic cores. Therefore, the gradient of the magnetic field near the tip of the pole is generally increased with the predetermined recording current, so that a signal is recorded with a steeper flux reversal state. Further, by making $B_{HB1}$ larger than $B_{HB2}$, in the process of increase of the recording current, the magnetization of the tip of the upper magnetic core reaches the saturation level with a larger current after the magnetization of the tip of the lower magnetic core. Therefore, the gradient of the writing magnetic field of the upper pole side becomes larger than that of the writing magnetic field of the lower pole side, and as a result, it is possible to promote the reduction of the decrease of the reproducing output following the increase of the recording current.

FIG. 12 is a cross sectional view showing the construction of a core portion near the tip of the thin film magnetic head of still another embodiment of the present invention which is to be mounted to the magnetic disc unit. In FIG. 12, the reference numerals 121 and 122 respectively designate a part of an upper magnetic core, and a part of a lower magnetic core each of which is made of an Ni-Fe series material. Moreover, the reference numeral 123 designates a non-magnetic insulating layer which is made of an organic material such as a photoresist and fills a space between the upper magnetic core and the lower magnetic core, and the reference numeral 124 designates a coil which is made of a metallic conductor such as Cu and serves to magnetize the thin film magnetic head. Further, the tips of the upper magnetic core 121 and the lower magnetic core 122 which are provided in the medium facing portion of the tip of the thin film magnetic head, i.e., an upper pole 125 and a lower pole 126, confront with each other through a magnetic gap 127 which is made of a non-magnetic insulating material of a ceramic material such as alumina.

The constructional feature of the present embodiment is that a thin film magnetic substance 128 having larger saturation magnetic flux density than that of each of the upper and lower magnetic cores is formed on a surface of the upper pole 125 facing the magnetic gap, or a surface of the upper magnetic core 121, which includes that facing surface and is in contact with the non-magnetic insulating layer 123, by a predetermined thickness of tm. The thin film magnetic substance 128 is preferably made of a Co-Ni-Fe-Pd series crystalline material, a Co-Ta-Zr series amorphous material, or the like for example. As in In such a construction, by forming the thin film magnetic substance 128 in only a portion in the vicinity of the tip of the pole, in the process of increase of the recording current, the magnetization of the tip of the upper magnetic core reaches the saturation level with a larger current after the magnetization of the tip of the lower magnetic core. Therefore, the gradient of the writing magnetic field of the upper pole side becomes larger than that of the magnetic field of the lower pole side, and as a result, it is possible to promote the reduction of the decrease of the reproducing output following the increase of the recording current.

FIG. 13 is a cross sectional view showing the construction of a core portion near the tip of the thin film magnetic head of yet another embodiment of the present invention which is to be mounted to the magnetic disc unit. In FIG. 13, the reference numerals 131 and 132 respectively designate an upper magnetic core and a lower magnetic core each of which is made of an Ni-Fe series material. Moreover, the reference numeral 133 designates a non-magnetic insulating layer which is made of an organic material such as a photoresist and fills a space between the upper magnetic core and the lower magnetic core, and the reference numeral 134 designates a coil which is made of a metallic conductor such as Cu and serves to magnetize the thin film magnetic head. Further, the tips of the upper magnetic core 131 and the lower magnetic core 132 which are provided in the medium facing portion of the tip of the thin film magnetic head, i.e., an upper pole 135 and a lower pole 136, confront with each other through a magnetic gap 137 which is made of a non-magnetic insulating material of a ceramic material such as alumina.

The constructional feature of the present embodiment is that a thin film magnetic substance 138 having smaller saturation magnetic flux density than that of the lower magnetic core is formed on a surface of the lower magnetic core 132 confronting with the upper magnetic core 131 by a predetermined thickness $tm_2$. In such a construction, in the process of increase of the recording current, the magnetization of the tip of the lower magnetic core reaches the saturation level with a smaller current before the magnetization of the tip of the upper magnetic core. Therefore, the gradient of the writing magnetic field of the upper pole side becomes larger than that of the writing magnetic field of the lower pole side, and as a result, it is possible to promote the reduction of the decrease of the reproducing output following the increase of the recording current.

FIG. 14 is a cross sectional view showing the construction of a core portion near the tip of the thin film magnetic head of a further embodiment of the present invention which is to be mounted to the magnetic disc unit. In FIG. 14, the reference numerals 141 and 142 respectively designate an upper magnetic core and a lower magnetic core each of which is made of an Ni-Fe series material. Moreover, the reference numeral 143 designates a non-magnetic insulating layer which is made of an organic material such as a photoresist and fills a space between the upper magnetic core and the lower magnetic core, and the reference numeral 144 designates a coil which is made of a metallic conductor such as Cu and serves to magnetize the thin film magnetic head. Further, the tips of the upper magnetic core 141 and the lower magnetic core 142 which are provided in the medium facing portion of the tip of the thin film magnetic head, i.e., an upper pole 145 and a lower pole 146 confront with each other through a magnetic gap 147 which is made of a non-magnetic insulating material of a ceramic material such as alumina.

The constructional feature of the present embodiment is that the thin film magnetic head is provided with a ramp portion which is formed in the vicinity of the tip of their lower magnetic core 142 by the processing of digging the substrate and by laminating the patterned magnetic film and non-magnetic insulating layer, and the length Gd1 of a portion of the lower pole 146 facing the magnetic gap is shorter than the length Gdu of a portion of the upper pole 145 facing the magnetic gap. With such an arrangement, the construction of the tip of the head is obtained by reversing the positional relationship between the upper and lower poles having the construction shown in FIG. 7 for example. As a result, in the process of increasing the recording current, the magnetization of the tip of the lower magnetic core reaches the saturation level of the magnetization with a smaller current before the magnetization of the tip of the upper magnetic core. Therefore, the gradient of the writing magnetic field of the upper pole side becomes larger than that of the writing magnetic field of the lower pole side, and as a result, it is possible to promote the control of the decrease of the reproducing output following the increase of the recording current. Further, in the present embodiment, as shown in FIG. 14, on the surface of the upper magnetic core 141 confronting with the lower magnetic core 142, a thin film magnetic substance 148 having larger saturation magnetic flux density than that of the magnetic film of each of the remaining portion of the upper magnetic core and the lower magnetic core is formed by a predetermined thickness tm in such a way that one end thereof is exposed to the face of the magnetic head facing the recording medium. As a result, it is possible to prevent effectively the magnetic saturation of the tip of the upper pole. The thin film magnetic substance 148 is preferably made of a Co-Ni-Fe-Pd series crystalline material, a Co-Ta-Zr series amorphous material, or the like for example. With such a construction, in the process of increase of the recording current, the magnetization of the tip of the lower magnetic core reaches the saturation level of the core with a smaller current before the magnetization of the tip of the upper magnetic core. Therefore, the gradient of the magnetic field of the upper pole side becomes much larger than that of the magnetic field of the lower pole side, and as a result, it is possible to promote the great reduction of the decrease of the reproducing output following the increase of the recording current.

Figure 15:
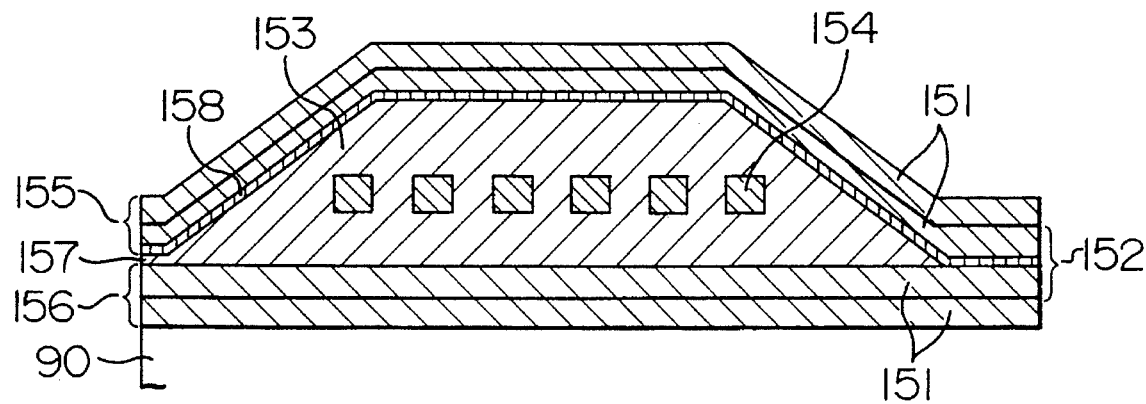
FIG. 15 is a cross sectional view showing one embodiment of the present invention.

FIG. 15 is a cross sectional view showing the construction of a core portion near the tip of the thin film magnetic head of even further embodiment of the present invention which is to be mounted to the magnetic disc unit. In the figure, the reference numerals 155 and 156 respectively designate an upper magnetic core and a lower magnetic core. Moreover, the reference numeral 153 designate a non-magnetic insulating layer which is made of an organic material such as a photoresist and fills a space between the upper magnetic core and the lower magnetic core, and the reference numeral 154 designates a coil which is made of a metallic conductor such as Cu and serves to magnetize the thin film magnetic head. Moreover, the tips of the upper magnetic core 155 and the lower magnetic core 156 which are provided in the medium facing portion of the tip of the thin film magnetic head confront with each other through a magnetic gap 157 which is made of a non-magnetic insulating layer of a ceramic material such as alumina.

The constructional feature of the present embodiment is that the magnetic gap side of the upper magnetic core 155 is constructed by a magnetic film (500 nm thickness) 158 which is made of a Co-Ni-Fe-Pd series crystalline material of 1.4 T saturation magnetic flux density, and the side of the upper magnetic core 155 opposite to the magnetic gap is constructed by alternately laminating a magnetic film (600 nm thickness) 151 made of an Ni-Fe series material of 1.0 T saturation magnetic flux density and a non-magnetic insulating film (30 nm thickness) 152 made of alumina up to five layers (in the figure, only two layers are illustrated for brevity). Moreover, the magnetic film (600 nm thickness) 151 made of an Ni-Fe series material (1.0 T saturation magnetic flux density) and the non-magnetic insulating film (30 nm thickness) 152 made of alumina are alternately laminated up to four layers (in the figure, only two layers are illustrated for brevity), thereby to form the lower magnetic core 156. By taking such a construction, since in the process of increase of the recording frequency eddy current loss is controlled, it is possible to promote the reduction of the decrease of the reproducing output at high frequencies.

Figure 16:
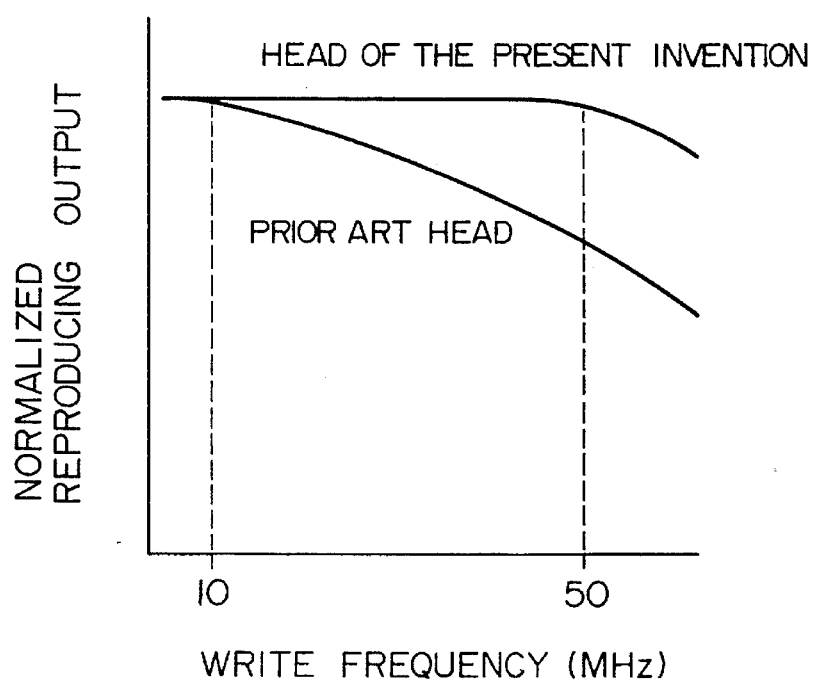
FIG. 16 is a graphical representation showing the relationship between a write frequency and the reproducing output.

FIG. 16 is a graphical representation showing the variation of the reproducing output with the write frequency for comparison of the above embodiment with the prior art head. The prior art head has the upper and lower magnetic cores each of which is made of an Ni-Fe series material (1.0 T saturation magnetic flux density). As shown in the figure, in the case of the head of the above embodiment shown in FIG. 15, the reproducing output is kept being sensibly constant up to 50 MHz, and thus, the decrease of the output at high frequencies of 10 MHz or more is reduced. As a result, it is readily understood that the objects of the present invention are sufficiently attained.

Figure 17:
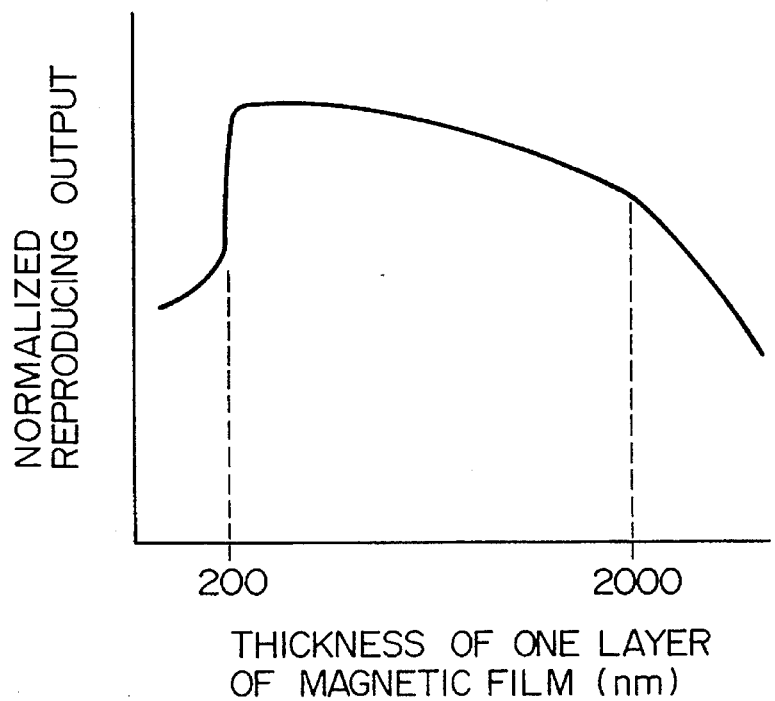
FIG. 17 is a graphical representation showing the relationship between a thickness of a magnetic film layer and the reproducing output.

FIG. 17 is a graphical representation showing the variation of the reproducing output with the thickness of the magnetic film 151 in the above embodiment. With respect to the number of layers of the magnetic film 151, the lower magnetic core has four layers, and the upper magnetic core has five layers. The write frequency is 50 MHz and the thickness of the non-magnetic insulating film 152 is 30 nm. The reproducing output is normalized with a value at 1 MHz. As shown in the figure, when the thickness of the magnetic film 151 is in the range of 200 to 2000 nm, the large reproducing output is obtained.

Figure 18:
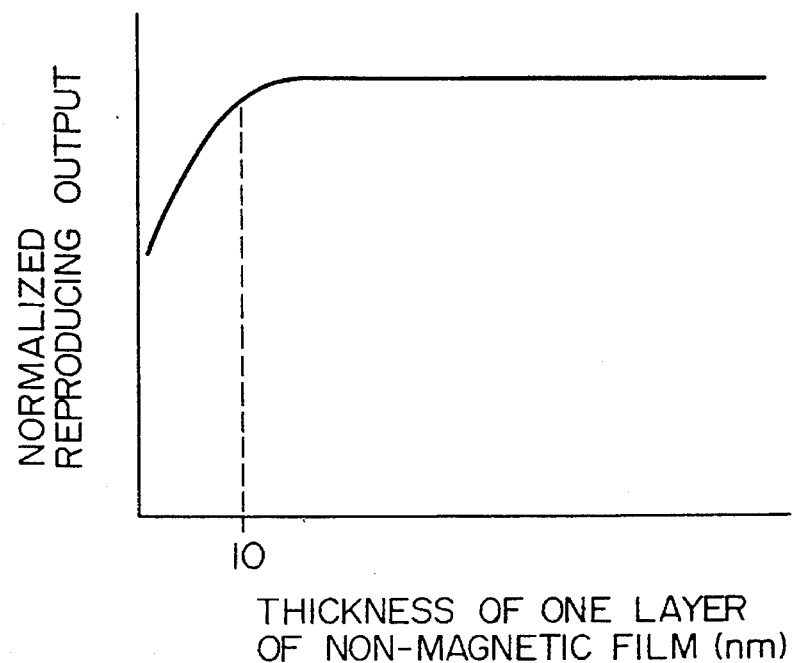
FIG. 18 is a graphical representation showing the relationship between a thickness of a non-magnetic insulating film layer and the reproducing output.

FIG. 18 is a graphical representation showing the variation of the reproducing output with the thickness of the non-magnetic insulating film 152 in the above embodiment. The thickness of the magnetic film 151 is 500 nm. With respect to the number of layers of the magnetic film 151, the lower magnetic core has four layers and the upper magnetic core has five layers. The write frequency is 50 MHz. The reproducing output is normalized with a value at 1 MHz. As shown in the figure, when the thickness of the non-magnetic insulating film 152 is in the range of 10 to 50 mm, the large reproducing output is obtained.

If the thickness of the non-magnetic layer 152 is set to a value more than 50 nm, there is the possibility that such a non-magnetic layers acts as the pseudo-gap, and the reproducing characteristics go wrong. The suitable thickness of the non-magnetic insulating film 152 is in the range of 10 to 50 nm.

Figure 19:
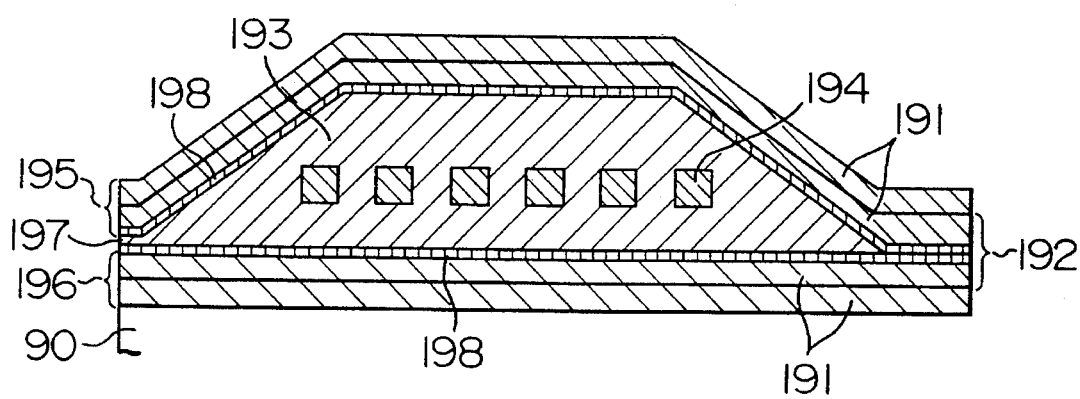
FIG. 19 is a cross sectional view showing one embodiment of the present invention.

FIG. 19 is a cross sectional view showing the construction of a core portion near the tip of the thin film magnetic head of an additional embodiment of the present invention which is to be mounted to the magnetic disc unit. In the figure, the reference numerals 195 and 196 respectively designate an upper magnetic core and a lower magnetic core. Moreover, the reference numeral 193 designates a non-magnetic insulating layer which is made of an organic material such as a photoresist and fills a space between the upper magnetic core and the lower magnetic core, and the reference numeral 194 designates a coil which is made of a metallic conductor such as Cu and serves to magnetize the thin film magnetic head. Moreover, the tips of the upper magnetic core 195 and the lower magnetic core 196 which are provided in the medium facing portion of the tip of the thin film magnetic head confront with each other through a magnetic gap 197 which is constructed by a non-magnetic insulating layer made of a ceramic material such as alumina.

The constructional feature of the present embodiment is that the magnetic gap side of the upper magnetic core 195 is constructed by a magnetic film (500 nm thickness) 198 made of a Co-Ni-Fe-Pd series crystalline material of 1.4 T saturation magnetic flux density, and the side of the upper magnetic core 195 opposite to the magnetic gap is constructed by alternately laminating a magnetic film (600 nm thickness) 191 made of an Ni-Fe series material of 1.0 T saturation magnetic flux density and a non-magnetic insulating film (30 nm thickness) 192 made of alumina up to five layers (in the figure, only two layers are illustrated for brevity). Moreover, the magnetic gap side of the lower magnetic core 196 is constructed by the magnetic film (500 nm thickness) 198 made of a Co-Ni-Fe-Pd series crystalline material of 1.4 T saturation magnetic flux density, and the side of the lower magnetic core 196 opposite to the magnetic gap is constructed by alternately laminating a magnetic film (600 nm thickness) 191 made of an Ni-Fe series material of 1.0 T saturation magnetic flux density and a non-magnetic insulating layer (30 nm thickness) 192 made of alumina up to four layers (in the figure, only two layers are illustrated for brevity). By taking such a construction, since in the process of increase of the recording frequency, eddy current loss is controlled, it is possible to promote the reduction of the decrease of the reproducing output at high frequencies.

Figure 20:
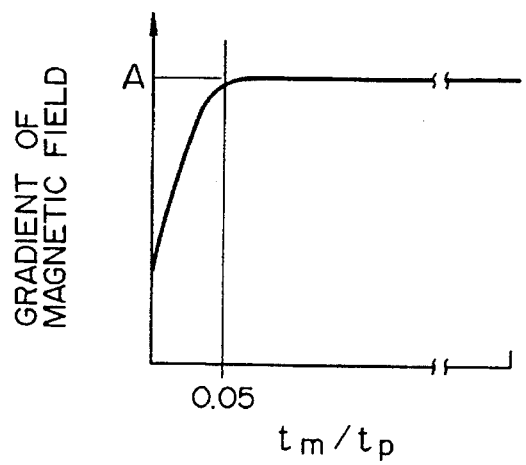
FIG. 20 is a graphical representation showing the relationship between a thickness and a gradient of a magnetic field.

FIG. 20 is a graphical representation showing the variation of the gradient of the magnetic field of the trailing side with the thickness tm of the thin film magnetic substance formed in the upper magnetic core, in each of the above-mentioned embodiments. In FIG. 20, the level A corresponds to the level of the gradient of the magnetic field in the case where the whole upper magnetic core is constructed by the thin film magnetic substance which is used in the portion of tm thickness. As shown in FIG. 20, by setting the thickness tm to 0.05 Tp or more, the gradient of the magnetic field rises up to a level near the level A. As a result, it is readily understood that the objects of the present invention are sufficiently attained.

Figure 21:
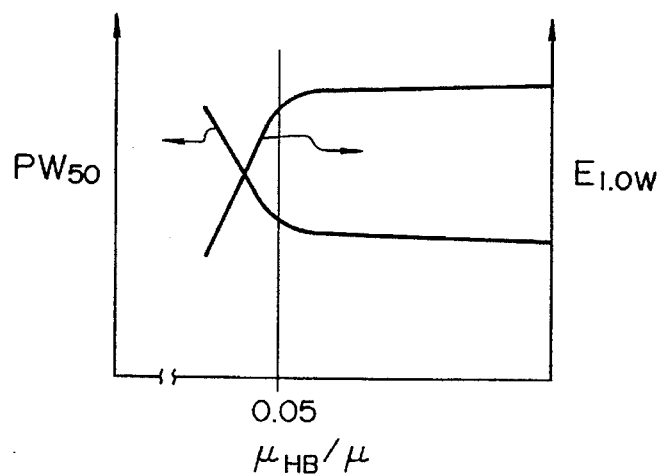
FIG. 21 is a graphical representation showing the relationship between permeability and the reproducing output.

FIG. 21 is a graphical representation showing the half-value width of the isolated reproducing waveform $PW_{50}$ and the amplitude $E_{LOW}$ with the relative permeability $\mu_{HB}$ of the thin film magnetic substance formed in a portion which is the inside portion of the upper magnetic core and in contact with the magnetic gap, in each of the above-mentioned embodiments. As shown in FIG. 21, even when the relative permeability $\mu_{HB}$ is decreased to 5% or so of the relative permeability $\mu$ of the remaining portion of the upper magnetic core and the lower magnetic core, the half-value width of the isolated reproducing waveform $PW_{50}$ and the amplitude $E_{LOW}$ hardly change. Thus, it is readily understood that the degree of freedom of material selection of the thin film magnetic substance which constructs a part of the upper magnetic core is increased, and as a result, the objects of the present invention are sufficiently attained.

Figure 22:
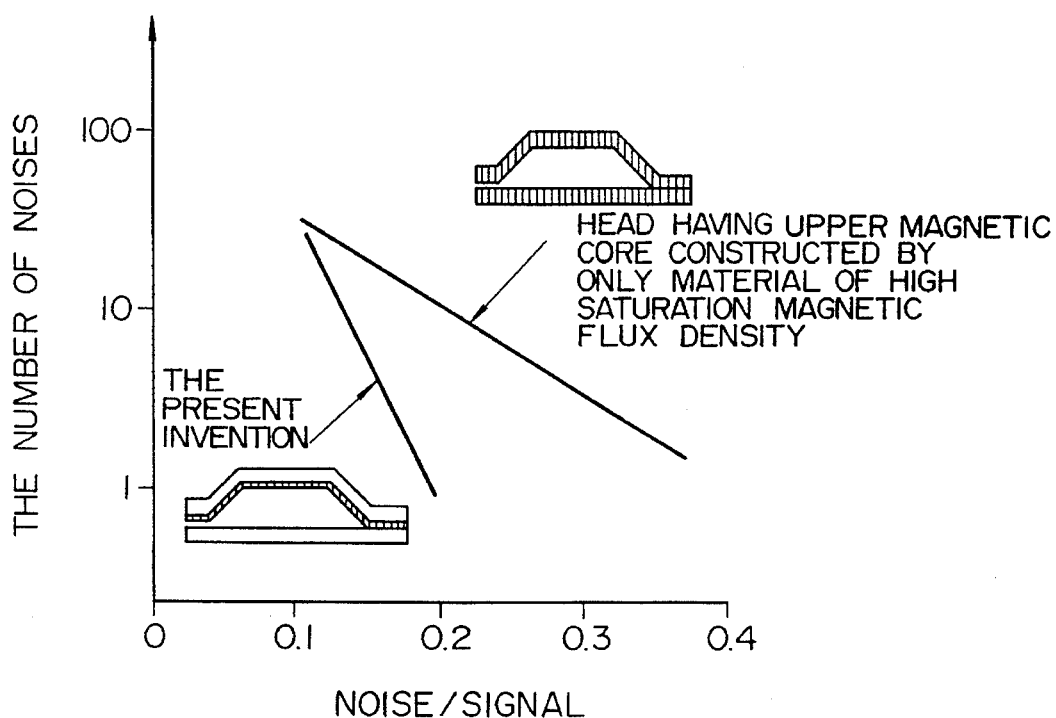
FIG. 22 is a graphical representation showing the relationship between a ratio N/S of a noise amplitude to a signal amplitude and the number of noise-after-write.

FIG. 22 is a graphical representation showing the relationship between the number of occurrence of the false signals after recording (noise-after-write) and the noise amplitude in the case where the thin film magnetic substance formed in the upper magnetic core is made of a Co-Ta-Zr series amorphous material, in each of the above-mentioned embodiments. In this connection, the noise-after-write is measured in the same manner as that disclosed in the article IEEE, TRANSACTIONS ON MAGNETICS, Vol. 25, No. 5 (1989–9), pp. 3212–3214. As shown in FIG. 22, in the thin film magnetic head of the present invention which is to be mounted to the magnetic disc unit, the number of occurrence of the noises-after-write is remarkably reduced, as compared with the head which is made of only a Co-Ta-Zr series amorphous material. Thus, the present head is improved up to a level which does not matter in practical application. As a result, it is readily understood that the objects of the present invention are sufficiently attained.

In the above-mentioned embodiments, considering the possibility that the magnetic characteristics of each magnetic substance go wrong due to the chemical reaction between the upper magnetic core and the thin film magnetic substance formed in the inside portion of that magnetic core, a non-magnetic layer made of $Al_2O_3$ for example may be provided between the upper magnetic core and the thin film magnetic substance of large saturation magnetic flux density. But, in this case, the thickness of that non-magnetic layer is preferably set to 1/10 or less of the magnetic gap length (e.g., if the gap length is 0.4 μm, that thickness is 0.04 μm). The provision of such a non-magnetic material of predetermined thickness allow the reaction between the upper magnetic core and the thin film magnetic substance to be sufficiently suppressed. If the thickness of such a non-magnetic layer is set to a value more than or equal to the above-mentioned value, there is the possibility that such a non-magnetic layer acts as the pseudo-gap, and the reproducing characteristics go wrong.

Figure 23:
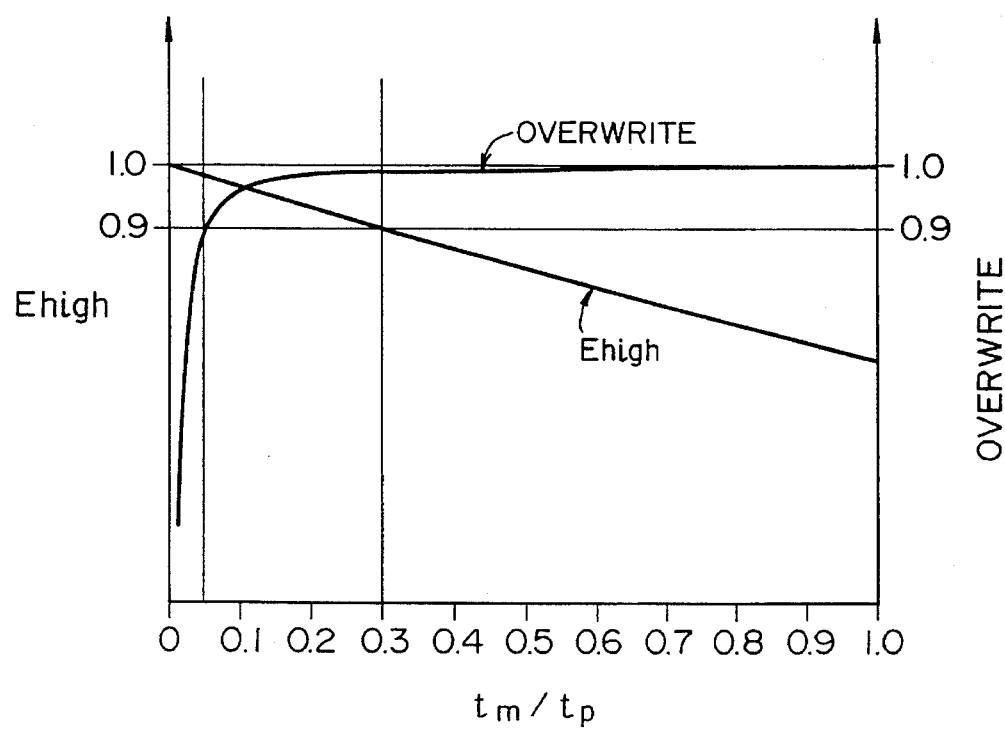
FIG. 23 is a graphical representation showing the relationship between the thickness and the reproducing output.

FIG. 23 is a graphical representation showing the result of measuring the changes of the overwrite performance and the output when the thickness tm of the thin film magnetic substance having high saturation magnetic flux density and low permeability and formed as a part of the upper magnetic core is changed in each of the above-mentioned embodiments. As shown in FIG. 23, there may be grasped the situation in which as the thickness tm of the magnetic layer of high saturation magnetic flux density is increased, the above-mentioned overwrite performance are improved, but the output is reduced due to the reduction of the reproducing efficiency. The overwrite performance is greatly improved even in a region of a small thickness tm. Therefore, the thickness tm is set to the range of 0.05 Tp to 0.5 Tp, thereby to sufficiently attain the objects of the present invention.

Figure 24:
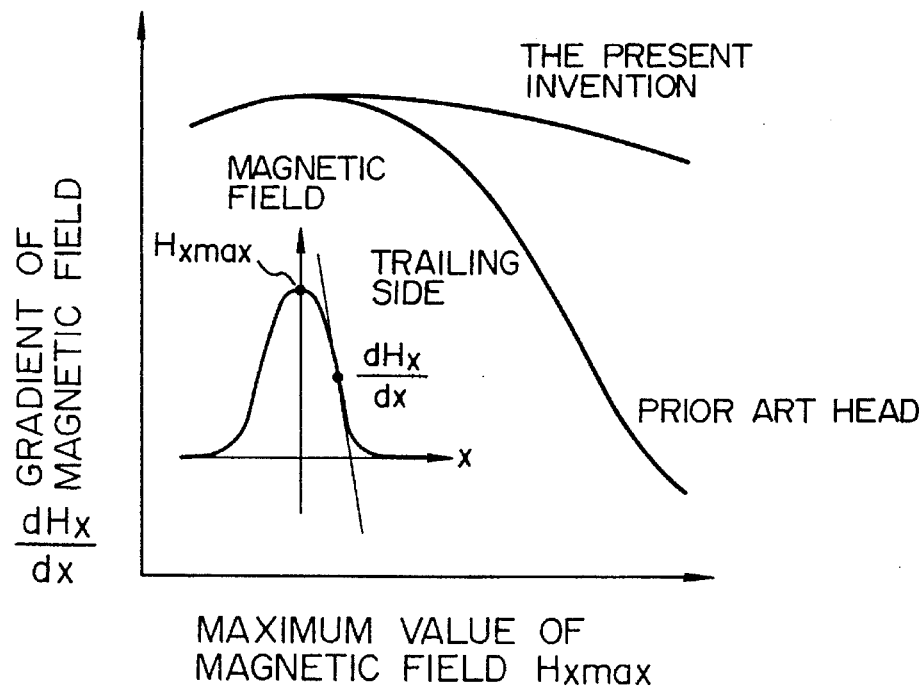
FIG. 24 is a graphical representation showing the relationship between the maximum value of the magnetic field and the gradient of the magnetic field.

The superiority of the thin film magnetic head used in the present invention over the prior art thin film magnetic head is clearly shown in FIG. 24. FIG. 24 is a graphical representation comparatively showing the relationship between the gradient of the recording magnetic field of the trailing side and the maximum value of the magnetic field near the center of the medium over the gap center at this time with the exciting current being changed, with respect to the thin film magnetic head of the present invention and the prior art thin film magnetic head. With the prior art head, when the exciting current is increased, the gradient of the magnetic field is largely reduced as the maximum value of the magnetic field is increased, whereas with the thin film magnetic head of the present invention, the degree of reduction of the gradient of the magnetic field is greatly improved. As a result, the quantity of reduction of the reproducing output due to increase of the magnetomotive force can be reduced to 10% or less of the maximum value of the output.

Figure 25:
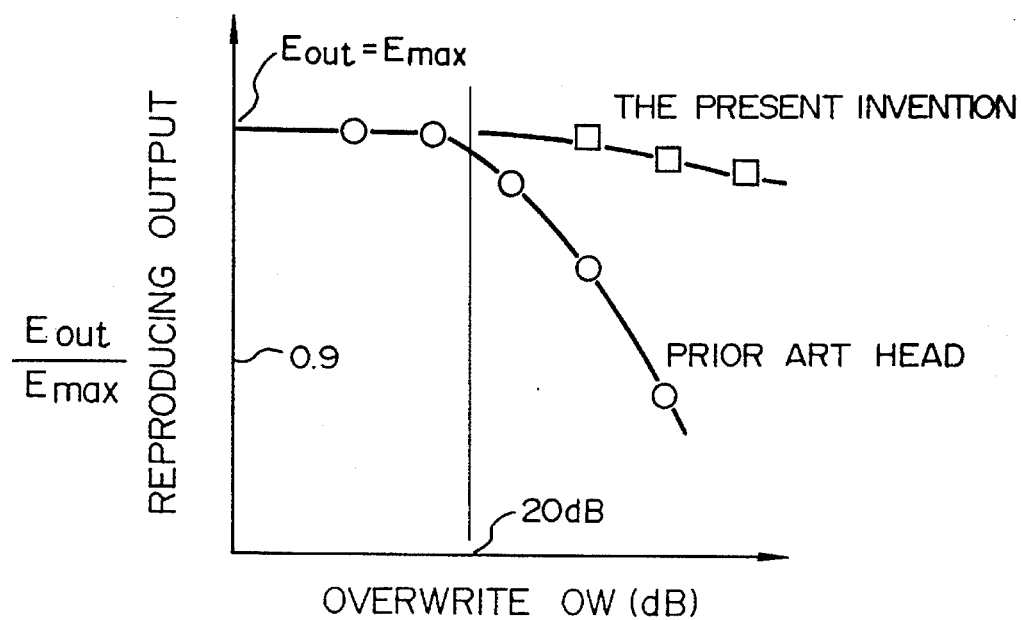
FIG. 25 is a graphical representation showing the relationship between the overwrite performance and the reproducing output.

FIG. 25 is a graphical representation comparatively showing the relationship between the measured values of the reproducing output and those of the overwrite performance, with the thin film magnetic head being magnetized by causing the recording current to flow through the thin film conductor coil, with respect to the thin film magnetic head of the present invention and the prior art thin film magnetic head. As apparent from the figure, it is readily understood that with the prior art head, the reproducing output is largely reduced as the overwrite performance is increased, whereas with the thin film magnetic head of the present invention, the large overwrite performance can be secured and also the reproducing output is hardly reduced.

In the above-mentioned embodiments, an example of the recording/reproducing head of induction type has been shown. As described above, however, since the recording and reproducing characteristics can be improved by preventing the magnetic saturation of the tip of the head in the recording operation, the present invention is also applicable to the recording head of induction type for a dual-element film head. In this case, the recording function and the reproducing function are separated from each other, and the resultant reproducing head utilizing the magnetoresistive effect is combined with the above recording head of induction type. That is, the magnetic material of high saturation magnetic flux density is used for the portion which is in contact with the magnetic gap and included in the tip of the pole of the trailing side of the recording thin film head which is used in combination with the magnetoresistive effect reproducing head for reading out the recorded information on the medium utilizing the change in resistance when the magnetic field is applied to the Ni-Fe thin film, whereby as described above, it is possible to largely increase the gradient of the magnetic field of the trailing side which determines the recording magnetization in the medium, control the increase of the flux reversal length of the recording magnetization in the medium, and reduce the decrease of the output which is to be reproduced by the magnetoresistive effect head.

In the above-mentioned embodiments, the saturation magnetic flux density Bs of Ni-Fe which is well known as the magnetic core material of the thin film magnetic head is about 1 tesla or more. As the material having saturation magnetic flux density Bs more than about 1 tesla, as described above, there are a Co-Ni-Fe-Pd series crystalline material, and a Co-Ta-Zr series amorphous material for example of which saturation magnetic flux density is about 1.3 tesla. Some of a Co-Ni-Fe series, and a Fe-Ta-C series crystalline materials show the saturation magnetic flux density Bs of about 1.6 tesla or more. Moreover, although the material for a part of elements other than the magnetic core has also been disclosed by giving an example, the present invention is not necessarily limited to such a material as described above.

If one example of the size of the thin film magnetic head which is an object of the present invention is given to readily understand the present invention, for example, the total length of the magnetic pole (pole length) Pt is in the range of 5 to 9 μm, the gap length G1 is in the range of 0.1 to 0.4 μm, and the throat height Gd is in the range of 0.01 to 2 μm.

Assuming that the gap length G1 is 0.4 μm or less, the pole length Pt is 5 μm or more, and the angle between the slope of the stepwise portion of the upper core and the non-magnetic gap layer is θ, the phenomenon of magnetic saturation of the gap facing portion of the tip of the upper magnetic pole becomes remarkable in the range to which the following relationship is applicable.

$$G1 < \tfrac{1}{4} \cdot Pt \cdot \sin 2\theta$$

For example, if Pt=6 μm, G1=0.4 μm, and the slope angle= 45°, the phenomenon of magnetic saturation of the gap facing portion of the tip of the upper magnetic pole becomes remarkable in the range of Gd<1.5 μm. The object of the present invention is to relax the phenomenon of saturation of the magnetic field in that range.

Pt, Gl, Gd and θ which were used in the above description are shown in FIG. 10 as one example.

One example of the magnetic disc unit having the thin film magnetic head of the present invention mounted thereto is as follows.

| Size of Magnetic Recording Medium | Thickness of Magnetic Disc Unit Having Thin Film Magnetic Head |
|---|---|
| 3.5 in | ¾ in H (19 mm) |
| 2.5 in | ¾ in H |

| Storage Capacity of the Whole Unit (GB) | The Number of Magnetic Surface Recording Medium | Density |
|---|---|---|
| 0.4–0.6 | 2–4 | 150–180 Mb/in² |
| 0.2–0.4 | 2–4 | 150–180 Mb/in² |

What is claimed is:

1. A magnetic disc unit comprising:
   a magnetic recording medium;
   a thin film magnetic head which confronts said magnetic recording medium,
      wherein said thin film magnetic head includes at least an upper magnetic core and a lower magnetic core;
   a head slider for carrying said thin film magnetic head;
   a spring member for supporting said head slider; a guide arm for connecting said spring member to a positioning mechanism;
   a disc rotation control system for rotating a disc relative to said recording medium;
   a head positioning control system for positioning said magnetic head;
   a recording/reproducing signal control system; and
   wherein at least an upper magnetic core of said thin film magnetic head includes at least two magnetic films, and
   a layer of magnetic material of said upper magnetic core in contact with a magnetic gap between said upper magnetic core and said lower magnetic core, said layer having a saturation magnetic flux density $B_{HB1}$ and a thickness less than that of a layer of said upper magnetic core not in contact with said magnetic gap, one end of said layer extending to an end of said thin film magnetic head which confronts said recording medium, and
   wherein a saturation magnetic flux density B1 of a magnetic material of said layer of said upper magnetic core not in contact with said magnetic gap, and a saturation magnetic flux density B2 of a magnetic material of said lower magnetic core are expressed by the following respective relationships:

$$B_{HB1} > B1, \text{ and } B_{HB1} > B2.$$

2. A magnetic disc unit having a thin film magnetic head mounted thereto according to claim 1, wherein the layer of said upper magnetic core in contact with said magnetic gap has one end extending to confront said recording medium, has a saturation magnetic flux density larger than that of the remaining portion of said upper magnetic core, and has a thickness of 0.05 Tp to 0.3 Tp, where Tp represents a thickness of said upper magnetic core.

3. A magnetic disc unit having a thin film magnetic head mounted thereto according to claim 1, wherein said layer of said upper magnetic core in contact with said magnetic gap, having one end extending to face said recording medium and a saturation magnetic flux density larger than that of the remaining portion of said upper magnetic core, has a permeability of 0.05 μ to 1 μ, where μ represents permeability of a magnetic material of the remaining portion of said upper magnetic core.

4. A magnetic disc unit having a thin film magnetic head mounted thereto according to claim 1, wherein a non-magnetic layer is provided between said layer of said upper magnetic core in contact with said magnetic gap, and the remaining portion of said upper magnetic core.

5. A magnetic disc unit having a thin film magnetic head mounted thereto according to claim 1, wherein a magnetic material of a magnetic layer of said upper magnetic core in contact with said magnetic gap having one end extending to face said recording medium and a saturation magnetic flux density different from that of the other portions of the magnetic cores is a crystalline or amorphous material of a Co base alloy, or a crystalline material of an Fe base alloy, and a main magnetic material including the remaining portion of said upper magnetic core and said lower magnetic core is Ni-Fe.

6. A magnetic disc unit having a thin film magnetic head mounted thereto according to claim 5, wherein said magnetic material of said magnetic layer of said upper magnetic core in contact with said magnetic gap having one end exposed to face said recording medium and a saturation magnetic flux density different from that of the other portion of said magnetic cores is a crystalline or amorphous material of an alloy containing one constituent as the main constituent which is selected from the group consisting of CoNiFePd, CoNiFe, CoTaZr, FeTaC, CoHfTaPd, FeAlSi, FeSi, FeGe, FeTi, FeN, CoFe, CoZr, and CoTi, and a thickness of said magnetic film is in the range of 0.05 Tp to 0.3 Tp where Tp represents a thickness of said upper magnetic core.

7. A magnetic disc unit having a thin film magnetic head mounted thereto according to claim 1, wherein said lower magnetic core is constructed by alternately laminating a magnetic film having a saturation magnetic flux density B2 and non-magnetic insulating film having two layers or more,
   the layer of said upper magnetic core in contact with said magnetic gap is constructed by a magnetic film having a saturation magnetic flux density $B_{HB1}$, and
   the layer of said upper magnetic core not in contact with said magnetic gap is constructed by alternately laminating a magnetic film of saturation magnetic density B1 and a non-magnetic insulating film having two layers or more.

8. A magnetic disc unit having a thin film magnetic head mounted thereto according to claim 7, wherein a thickness of every layer of said insulating film constituting each of said upper magnetic core and said lower magnetic core of said thin film magnetic head is in the range of 10 to 50 nm.

9. A magnetic disc unit having a thin film magnetic head mounted thereto according to claim 7, wherein a thickness of each of said magnetic films having a saturation magnetic film density B1 and said magnetic film having a saturation magnetic flux density B2 is in the range of 200 to 2000 nm.

10. A thin film magnetic head as defined in claim 7, wherein said non-magnetic insulating film constituting each of said upper magnetic core and said lower magnetic core is made of $Al_2O_3$, $SiO_2$, $ZrO_2$, SiN, Ti-C, $Y_2O_3$, BN, $Ta_2O_5$ or a mixed material thereof.

11. A magnetic disc unit having a thin film magnetic head mounted thereto according to claim 7, wherein a magnetic material of said magnetic layer of said upper magnetic core in contact with said magnetic gap having one end extending to face of said recording medium and a saturation magnetic flux density different from that of the other portion of said magnetic cores is a crystalline or amorphous material of an alloy containing one constituent as the main constituent which is selected from the group consisting of CoNiFePd, CoNiFe, CoTaZr, FeTaC, CoHfTaPd, FeAlSi, FeSi, FeGe, FeTi, FeN, CoFe, CoZr and CoTi, and a thickness of said magnetic film is in the range of 0.05 Tp to 0.3 Tp where Tp represents a thickness of said upper magnetic core, and a magnetic material of the other portion of said magnetic cores of said recording head is mainly Ni-Fe.

12. A magnetic disc unit having a thin film magnetic head mounted thereto according to claim 1, wherein a layer of said lower magnetic core in contact with said magnetic gap is constructed by a magnetic film having a saturation magnetic flux density $B_{HB2}$, the layers of said lower magnetic core not in contact with said magnetic gap are constructed by alternately laminating a magnetic film having a saturation flux density B2 and a non-magnetic insulating film up to two layers or more, the layer of said upper magnetic core in contact with said magnetic gap is constructed by a magnetic film of saturation magnetic flux density $B_{HB1}$, and the layer of said upper magnetic core not in contact with said magnetic gap is constructed by alternately laminating a magnetic film having a saturation magnetic flux density B1 and a non-magnetic insulating film up to two layers or more.

13. A magnetic disc unit having a thin film magnetic head mounted thereto according to claim 12, wherein a thickness of every layer of said insulating film constituting each of said upper magnetic core and said lower magnetic core of said thin film magnetic head is in the range of 10 to 50 nm.

14. A magnetic disc unit having a thin film magnetic head mounted thereto according to claim 12, wherein a thickness of every layer of said magnetic films of saturation magnetic film density $B_1$ and said magnetic film of saturation magnetic flux density $B_2$ of said thin film magnetic head is in the range of 200 to 2000 nm.

15. A thin film magnetic head as defined in claim 12, wherein said non-magnetic insulating film constituting each of said upper magnetic core and said lower magnetic core is made of $Al_2O_3$, $SiO_2$, $ZrO_2$, SiN, Ti-C, $Y_2O_3$, BN, $Ta_2O_5$ or a mixed material thereof.

16. A magnetic disc unit having a thin film magnetic head mounted thereto according to claim 12, wherein a magnetic material of said magnetic layer of said upper magnetic core in contact with said magnetic gap having one end extending to face head facing said recording medium and a saturation magnetic flux density different from that of the other portion of said magnetic cores is a crystalline or amorphous material of an alloy containing one constituent as the main constituent which is selected from the group consisting of CoNiFePd, CoNiFe, CoTaZr, FeTaC, CoHfTaPd, FeAlSi, FeSi, FeGe, FeTi, FeN, CoFe, CoZr and CoTi, and a thickness of said magnetic film is in the range of 0.05 Tp to 0.3 Tp where Tp represents a thickness of said upper magnetic core, and a magnetic material of the other portion of said magnetic cores of said recording head is mainly Ni-Fe.

17. A magnetic disc unit comprising:

a magnetic recording medium;

a thin film magnetic head which confronts said magnetic recording medium,
  said thin film magnetic head including at least an upper magnetic core and a lower magnetic core;

a head slider for carrying said thin film magnetic head;

a spring member for supporting said head slider;

a guide arm for connecting said spring member to a positioning mechanism;

a disc rotation control system for rotating a disc relative to said recording medium;

a head positioning control system for positioning said magnetic head; and a recording/reproducing signal control system;

wherein at least said upper magnetic core of said thin film magnetic head includes:
  at least two magnetic films, wherein one of said at least two magnetic films is a layer of magnetic material in contact with a magnetic gap between said upper magnetic core and a lower magnetic core, said layer having a saturation magnetic flux density $B_{HB1}$ and a thickness less than that of the other magnetic film of said upper magnetic core, one end of said layer extending to an end of said thin film magnetic head which confronts said recording medium, and wherein a saturation magnetic flux density B1 of a magnetic material of the other magnetic film of said upper magnetic core, which is not in contact with said magnetic gap, and a saturation magnetic flux density B2 of a magnetic material of said lower magnetic core are expressed by the following relationships:

$B_{HB1} > B1$, and $B_{HB1} > B2$.

18. A thin film magnetic head comprising:

a substrate;

a lower magnetic core formed on said substrate; and an upper magnetic core formed on said lower magnetic core and forming, together with said lower magnetic core, a magnetic gap facing a recording medium, and a magnetic circuit through said magnetic gap;

wherein said upper magnetic core includes at least two magnetic films, a first one of said at least two magnetic films being in contact with said magnetic gap and having a saturation magnetic flux density larger than that of a second one of said at least two magnetic films and having a thickness less than that of said second magnetic film of said upper magnetic core.

19. A magnetic disc unit comprising:

a magnetic recording medium;

a thin film magnetic head which confronts said magnetic recording medium, said thin film magnetic head including at least an upper magnetic core and a lower magnetic core;

a head slider for carrying said thin film magnetic head;

a spring member for supporting said head slider;

a guide arm for connecting said spring member to a positioning mechanism;

a disc rotation control system for rotating a disc relative to said recording medium;

a head positioning control system for positioning said magnetic head; and a recording/reproducing signal control system;

wherein at least said upper magnetic core of said thin film magnetic head includes:

at least two magnetic films, wherein one of said at least two magnetic films is a layer of magnetic material formed on an inside portion of said upper magnetic core and in contact with a magnetic gap between said upper magnetic core and said lower magnetic core, said layer having a saturation magnetic flux density $B_{HB1}$ and a thickness less than that of the other magnetic film of said upper magnetic core, one end of said layer extending to an end of said thin film magnetic head which confronts said recording medium, and wherein a saturation magnetic flux density B1 of a magnetic material of the other magnetic film of said upper magnetic core, which is not in contact with said magnetic gap, and a saturation magnetic flux density B2 of a magnetic material of said lower magnetic core are expressed by the following respective relationships:

$B_{HB1} > B1$, and $B_{HB1} > B2$.

20. A magnetic disc unit comprising:

a magnetic recording medium;

a thin film magnetic head which confronts said magnetic recording medium,
said thin film magnetic head including at least an upper magnetic core and a lower magnetic core;

a head slider for carrying said thin film magnetic head;

a spring member for supporting said head slider;

a guide arm for connecting said spring member to a positioning mechanism;

a disc rotation control system for rotating a disc relative to said recording medium;

a head positioning control system for positioning said magnetic head; and a recording/reproducing signal control system;

wherein said upper magnetic core and said lower magnetic core of said thin film magnetic head are provided, in respective portions near respective tips thereof, with respective ramps adjacent to a magnetic gap portion therebetween, and a distance between the tip of said lower magnetic core and a ramp starting position of said lower magnetic core is shorter than a distance between the tip of said upper magnetic core and a ramp starting position of said upper magnetic core; and wherein said upper magnetic core includes a magnetic layer along an inside portion thereof of said upper magnetic core, said magnetic layer having a saturation magnetic flux density that is larger than a saturation magnetic flux density of a remainder of said upper magnetic core and a thickness that is less than that of said remainder of said upper magnetic core.

21. A magnetic disc unit comprising:

a magnetic recording medium;

a thin film magnetic head which confronts said magnetic recording medium
said thin film magnetic head including at least an upper magnetic core and a lower magnetic core;

a head slider for carrying said thin film magnetic head;

a spring member for supporting said head slider;

a guide arm for connecting said spring member to a positioning mechanism;

a disc rotation control system for rotating a disc relative to said recording medium;

a head positioning control system for positioning said magnetic head; and a recording/reproducing signal control system;

wherein at least said upper magnetic core of said thin film magnetic head includes:

at least two magnetic films, wherein one of said at least two magnetic films is a layer of magnetic material formed on an inside portion of said upper magnetic core and in contact with a magnetic gap between said upper magnetic core and said lower magnetic core, said layer having a saturation magnetic flux density $B_{HB1}$ and a thickness less than that of the other magnetic film of said upper magnetic core, one end of said layer extending to an end of said thin film magnetic head which confronts said recording medium, and wherein a saturation magnetic flux density B1 of a magnetic material of the other magnetic film of said upper magnetic core, which is not in contact with said magnetic gap, and a saturation magnetic flux density B2 of a magnetic material of said lower magnetic core are expressed by the following relationships:

$B_{HB1} > B1$, and $B_{HB1} > B2$.

22. A thin film magnetic head comprising:

a substrate;

a lower magnetic core formed on said substrate; and an upper magnetic core provided above said lower magnetic core and forming, together with said lower magnetic core, a magnetic gap facing a recording medium, and a magnetic circuit through said magnetic gap;

wherein said magnetic head includes at least two magnetic films, one of said magnetic film being in contact with said magnetic gap and having a saturation magnetic flux density which is larger than that of the other magnetic film; and wherein said upper magnetic core includes a magnetic layer along an inside portion thereof of said upper magnetic core, said magnetic layer having a saturation magnetic flux density that is larger than a saturation magnetic flux density of a remainder of said upper magnetic core and a thickness that is less than that of said remainder of said upper magnetic core.

23. A magnetic disc unit comprising:

a magnetic recording medium;

a thin film magnetic head which confronts said magnetic recording medium,
said thin film magnetic head including at least an upper magnetic core and a lower magnetic core;

a head slider for carrying said thin film magnetic head;

a spring member for supporting said head slider;

a guide arm for connecting said spring member to a positioning mechanism;

a disc rotation control system for rotating a disc relative to said recording medium;

a head positioning control system for positioning said magnetic head; and a recording/reproducing signal control system;

wherein at least one of said upper magnetic core and said lower magnetic core of said thin film magnetic head includes:

at least two magnetic films, wherein one of said at least two magnetic films is a layer of magnetic material formed on an inside portion of the at least one of said upper magnetic core and said lower magnetic core and in contact with a magnetic gap having a saturation magnetic flux density $B_{HB}$ and a thickness less than that of the other magnetic film of said one of said upper magnetic core and said lower magnetic core, one end of said layer extending to an end of said thin film magnetic head which confronts said recording medium, and wherein a saturation magnetic flux density B1 of a magnetic material of the other magnetic film of said upper magnetic core, which is not in contact with said magnetic gap and a saturation magnetic flux density B2 of a magnetic material of said lower magnetic core are expressed by the following respective relationships:

$B_{HB}>B1$, and $B_{HB}>B2$.

24. A magnetic disc unit comprising:

a magnetic recording medium;

a thin film magnetic head which confronts said magnetic recording medium, said thin film magnetic head including at least an upper magnetic core and a lower magnetic core;

a head slider for carrying said thin film magnetic head;

a spring member for supporting said head slider;

a guide arm for connecting said spring member to a positioning mechanism;

a disc rotation control system for rotating a disc relative to said recording medium;

a head positioning control system for positioning said magnetic head; and a recording/reproducing signal control system;

wherein said lower magnetic core and said upper magnetic core of said thin film magnetic head are provided, in respective portions near respective tips thereof, with respective ramps adjacent to a magnetic gap portion, and a distance between the tip of said lower magnetic core and a ramp starting position of said lower magnetic core is shorter than a distance between the tip of said upper magnetic core and a ramp starting position of said upper magnetic core; and wherein at least one of said lower magnetic core or said upper magnetic core includes a magnetic layer along an inside portion thereof of at least one of said lower magnetic core and said upper magnetic core, said magnetic layer having a saturation magnetic flux density that is larger than a saturation magnetic flux density of a remainder of the at least one of said lower magnetic core and said upper magnetic core and a thickness that is less than that of said remainder of said at least one of said lower magnetic core and said upper magnetic core.

25. A magnetic disc unit comprising:

a magnetic recording medium;

a thin film magnetic head which confronts said magnetic recording medium, said thin film magnetic head including at least an upper magnetic core and a lower magnetic core;

a head slider for carrying said thin film magnetic head;

a spring member for supporting said head slider;

a guide arm for connecting said spring member to a positioning mechanism;

a disc rotation control system for rotating a disc relative to said recording medium;

a head positioning control system for positioning said magnetic head; and a recording/reproducing signal control system;

wherein at least one of said upper magnetic core and said lower magnetic core of said thin film magnetic head includes:

at least two magnetic films, wherein one of said at least two magnetic films is a layer of magnetic material formed on an inside portion of the at least one of said upper magnetic core or said lower magnetic core and in contact with a magnetic gap between said upper magnetic core and said lower magnetic core, said layer having a saturation magnetic flux density $B_{HB}$ and a thickness less than that of the other magnetic film of said at least one of said lower magnetic core and said upper magnetic core, one end of said layer formed on the inside portion of the at least one extending to an end of said thin film magnetic head which confronts said recording medium, and wherein a saturation magnetic flux density B1 of a magnetic material of the other magnetic film of said upper magnetic core, which is not in contact with said magnetic gap, and a saturation magnetic flux density B2 of a magnetic material of a lower magnetic core are expressed by the following relationships:

$B_{HB}>B1$, and $B_{HB}>B2$.

26. A thin film magnetic head comprising:

a substrate;

a lower magnetic core formed on said substrate; and an upper magnetic core formed on said lower magnetic core and forming, together with said lower magnetic core, a magnetic gap facing a recording medium, and a magnetic circuit through said magnetic gap;

wherein said magnetic head includes at least two magnetic films, one of said magnetic films being in contact with said magnetic gap having a saturation magnetic flux density larger than that of the other magnetic film of said upper magnetic core and said lower magnetic core; and wherein at least one of said lower magnetic core or said upper magnetic core includes a magnetic layer along an inside portion thereof of at least one of said lower magnetic core and said upper magnetic core, said magnetic layer having a saturation magnetic flux density that is larger than a saturation magnetic flux density of a remainder of the at least one of said lower magnetic core and said upper magnetic core and a thickness that is less than that of said remainder of said at least one of said lower magnetic core and said upper magnetic core.

27. A magnetic disc unit comprising:

a magnetic recording medium;

a thin film magnetic head which confronts said magnetic recording medium, said thin film magnetic head including at least an upper magnetic core and a lower magnetic core;

a head slider for carrying said thin film magnetic head;

a spring member for supporting said head slider;

a guide arm for connecting said spring member to a positioning mechanism;

a disc rotation control system for rotating a disc relative to said recording medium;

a head positioning control system for positioning said magnetic head; and a recording/reproducing signal control system;

wherein at least one of said upper magnetic core and said lower magnetic core of said thin film magnetic head includes:

at least two magnetic films, wherein one of said at least two magnetic films is a layer of magnetic material in contact with a magnetic gap between said upper magnetic core and said lower magnetic core, said layer having a saturation magnetic flux density $B_{HB}$ and a thickness less than that of the other magnetic film of said upper magnetic core, one end of said layer extending to an end of said thin film magnetic head which confronts said recording medium, and wherein a saturation magnetic flux density B1 of a magnetic material of the other magnetic film of said upper magnetic core, which is not in contact with said magnetic gap, and a saturation magnetic flux density B2 of a magnetic material of said lower magnetic core are expressed by the following respective relationships:

$B_{HB}$>B1, and $B_{HB}$>B2 and B1>B2.

28. A magnetic disc unit comprising:

a magnetic recording medium;

a thin film magnetic head which confronts said magnetic recording medium, said thin film magnetic head including at least an upper magnetic core and a lower magnetic core;

a head slider for carrying said thin film magnetic head;

a spring member for supporting said head slider;

a guide arm for connecting said spring member to a positioning mechanism;

a disc rotation control system for rotating a disc relative to said recording medium;

a head positioning control system for positioning said magnetic head; and a recording/reproducing signal control system;

wherein said lower magnetic core and said upper magnetic core of said thin film magnetic head are provided, in respective portions near respective tips thereof, with respective ramps adjacent to a magnetic gap portion, and a distance between the tip of said lower magnetic core and a ramp starting position of said lower magnetic core is shorter than a distance between the tip of said upper magnetic core and a ramp starting position of said upper magnetic core; and wherein at least one of said lower magnetic core or said upper magnetic core includes a magnetic layer along an inside portion thereof of at least one of said lower magnetic core and said upper magnetic core, said magnetic layer having a saturation magnetic flux density that is larger than a saturation magnetic flux density of a remainder of the at least one of said lower magnetic core and said upper magnetic core, a thickness that is less than that of another magnetic layer of said at least one of said lower magnetic core and said upper magnetic core and the saturation magnetic flux density of said upper magnetic core is larger than that of said lower magnetic core.

29. A magnetic disc unit comprising:

a magnetic recording medium;

a thin film magnetic head which confronts said magnetic recording medium, said thin film magnetic head including at least an upper magnetic core and a lower magnetic core;

a head slider for carrying said thin film magnetic head;

a spring member for supporting said head slider;

a guide arm for connecting said spring member to a positioning mechanism;

a disc rotation control system for rotating a disc relative to said recording medium;

a head positioning control system for positioning said magnetic head; and a recording/reproducing signal control system;

wherein at least one of said upper magnetic core and said lower magnetic core of said thin film magnetic head includes:

at least two magnetic films, wherein one of said at least two magnetic films is a layer of magnetic material formed on an inside portion of the at least one of said upper magnetic core or said lower magnetic core and in contact with a magnetic gap between said upper magnetic core and said lower magnetic core, said layer having a saturation magnetic flux density $B_{HB}$ and a thickness less than that of the other magnetic film of said at least one of said lower magnetic core and said upper magnetic core, one end of said layer extending to an end of said thin film magnetic head which confronts said recording medium, and wherein a saturation magnetic flux density B1 of a magnetic material of the other magnetic film of said upper magnetic core which is not in contact with said magnetic gap and a saturation magnetic flux density B2 of a magnetic material of said lower magnetic core are expressed by the following relationships:

$B_{HB}$>B1, and $B_{HB}$>B2 and B1>B2.

30. A thin film magnetic head comprising:

a substrate;

a lower magnetic core formed on said substrate; and an upper magnetic core formed on said lower magnetic core and forming, together with said lower magnetic core, a magnetic gap facing a recording medium, and a magnetic circuit through said magnetic gap;

wherein said magnetic head includes at least two magnetic films, one of said magnetic films in contact with said magnetic gap having a saturation magnetic flux density larger than that of other portions of said upper magnetic core and said lower magnetic core; and wherein at least one of said lower magnetic core or said upper magnetic core includes a magnetic layer along an inside portion thereof of at least one of said lower magnetic core and said upper magnetic core, said magnetic layer having a saturation magnetic flux density that is larger than a saturation magnetic flux density of a remainder of the at least one of said lower magnetic core and said upper magnetic core, a thickness that is less than that of said remainder of said at least one of said lower magnetic core and said upper magnetic core and the saturation magnetic flux density of said upper magnetic core is larger than that of said lower magnetic core.

* * * * *